United States Patent
Canberk et al.

(10) Patent No.: US 11,863,963 B2
(45) Date of Patent: Jan. 2, 2024

(54) AUGMENTED REALITY SPATIAL AUDIO EXPERIENCE

(71) Applicant: Snap Inc., Santa Monica, CA (US)

(72) Inventors: Ilteris Canberk, Marina Del Rey, CA (US); Shin Hwun Kang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 205 days.

(21) Appl. No.: 17/528,713

(22) Filed: Nov. 17, 2021

(65) Prior Publication Data

US 2022/0182777 A1    Jun. 9, 2022

Related U.S. Application Data

(60) Provisional application No. 63/122,349, filed on Dec. 7, 2020.

(51) Int. Cl.
*H04S 7/00* (2006.01)
*G02B 27/01* (2006.01)

(52) U.S. Cl.
CPC ............ *H04S 7/303* (2013.01); *G02B 27/017* (2013.01); *G02B 2027/0138* (2013.01); *G02B 2027/0178* (2013.01); *H04S 2400/11* (2013.01)

(58) Field of Classification Search
None
See application file for complete search history.

(56) References Cited

U.S. PATENT DOCUMENTS

| | | | |
|---|---|---|---|
| 11,089,427 B1 | 8/2021 | Canberk et al. | |
| 11,386,600 B2 * | 7/2022 | Joo | G06F 3/14 |
| 2006/0238877 A1 | 10/2006 | Ashkenazi et al. | |
| 2014/0364197 A1 * | 12/2014 | Osman | A63F 13/493 463/24 |
| 2016/0027218 A1 * | 1/2016 | Salter | G06F 3/012 345/633 |
| 2018/0077513 A1 | 3/2018 | Link | |
| 2018/0300952 A1 * | 10/2018 | Evans | G06F 9/453 |
| 2018/0352018 A1 * | 12/2018 | Mate | G11B 27/031 |
| 2020/0020310 A1 * | 1/2020 | Kumar | G06F 3/03545 |
| 2020/0053505 A1 | 2/2020 | Peters et al. | |
| 2020/0128232 A1 | 4/2020 | Hwang et al. | |
| 2020/0226814 A1 * | 7/2020 | Tang | G06F 3/0304 |

(Continued)

OTHER PUBLICATIONS

International Search Report and Written Opinion for International Application No. PCT/US2021/059696, dated Mar. 14, 2022 (dated Mar. 14, 2022)—13 pages.

*Primary Examiner* — Duc Nguyen
*Assistant Examiner* — Assad Mohammed
(74) *Attorney, Agent, or Firm* — Culhane Meadows PLLC; Stephen J. Weed

(57) ABSTRACT

Devices, media, and methods are presented for an immersive augmented reality (AR) experience using an eyewear device with spatial audio. The eyewear device has a processor, a memory, and image sensor, and a speaker system. The eyewear device captures image information for an environment surrounding the device and identifies an object location within the same environment. The eyewear device then associates a virtual object with the identified object location. The eyewear device monitors the position of the device with respect to the virtual object and presents audio signals to alert the user that the identified object is in the environment.

16 Claims, 18 Drawing Sheets

(56) References Cited

U.S. PATENT DOCUMENTS

2020/0241291 A1* 7/2020 Walker .................... G06F 3/167
2021/0219088 A1 7/2021 Engle
2021/0306791 A1 9/2021 Canberk et al.

* cited by examiner

US 11,863,963 B2

AUGMENTED REALITY SPATIAL AUDIO EXPERIENCE

CROSS-REFERENCE TO RELATED APPLICATIONS

This application claims priority to U.S. Provisional Application Ser. No. 63/122,349 filed on Dec. 7, 2020, the contents of which are incorporated fully herein by reference.

TECHNICAL FIELD

Examples set forth in the present disclosure relate to portable electronic devices, including wearable devices such as eyewear, having spatial audio feedback for user entertainment.

BACKGROUND

Many types of computers and electronic devices available today, such as mobile devices (e.g., smartphones, tablets, and laptops), handheld devices (e.g., smart rings, special-purpose accessories), and wearable devices (e.g., smart glasses, digital eyewear, headwear, headgear, and head-mounted displays), include a variety of sensors, wireless transceivers, input systems (e.g., touch-sensitive surfaces, pointers), peripheral devices, and output devices.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more non-limiting examples. Included in the drawing are the following figures.

DETAILED DESCRIPTION

Figure 1A:
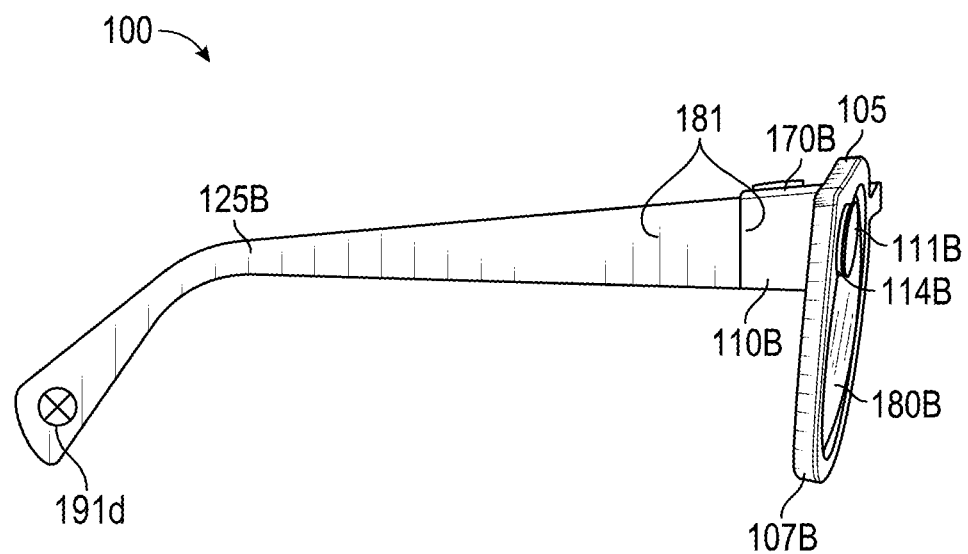
FIG. 1A is a side view (right) of an example hardware configuration of an eyewear device suitable for use in an augmented reality system.

Examples of devices, methods, and media are presented for an immersive AR experience using an eyewear device with spatial audio. The eyewear device has a processor, a memory, and image sensor, and a speaker system. The eyewear device captures image information for an environment surrounding the device and identifies an object location within the same environment. The eyewear device then associates a virtual object with the identified object location. The eyewear device monitors the position of the device with respect to the virtual object and presents audio signals to alert the user that the identified object is in the environment.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The term "coupled" or "connected" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

The orientations of the eyewear device, the handheld device, associated components and any other complete devices incorporating a camera and/or an inertial measurement unit such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera and/or inertial measurement unit as constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims. Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible and/or include a raised or otherwise tactile edge that provides feedback to the user about the location and boundary of the touchpad 181. In other examples, the eyewear 100 may include a touchpad on the left side.

The surface of the touchpad 181 is configured to detect finger touches, taps, and gestures (e.g., moving touches) for use with a GUI displayed by the eyewear, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display and/or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Additionally, the eyewear device 100 includes at least two speakers, e.g., one or more speakers on a left side of the eyewear device 100 (left speakers 191A and 191C) and one or more speakers on a right side of the eyewear device 100 (a right speakers 191B and 191D, for presenting audio signals to a left ear and a right ear of a wearer, respectively. An audio processor 413 (FIG. 4) of the stereo speaker system delivers audio signals to the speakers 191. The speakers 191 may be incorporated into the frame 105, temples 125, or corners 110 of the eyewear device 100. The speakers 191 are driven by audio processor 413 under control of low-power circuitry 420, high-speed circuitry 430, or both. The speakers 191 are for presenting audio signals including, for example, an audio track associated with a virtual object or virtual object theme. The audio processor 413 is coupled to the speakers 191 in order to control the presentation of sound (e.g., in accordance with head-related transfer function, head-related transfer function (HRTF), modeling) to provide acoustical position information corresponding to the location of virtual objects presented on the image displays of optical assemblies 180A-B. Audio processor 413 may be any processor capable of managing audio processing needed for eyewear device 100 (e.g., capable of HRTF modeling). In one example, the eyewear device 100 includes a left front speaker 191A, a right front speaker 191B, a left rear speaker 191C, and a right rear speaker 191D. The speakers 191 are positioned at various locations around the eyewear 100 to present directional audio zones for guiding a user wearing the eyewear device 100. For example, presenting an audio signal from both rear speakers 191C, D generates a rear directional audio zone indicating a virtual object is behind the wearer, presenting an audio signal from the right rear speakers 191D generates a right-rear directional audio zone indicating a virtual object is behind the wearer to the right, and presenting an audio signal from right front speaker 191B and the right rear speaker 191D generates a right side directional audio zone indicating a virtual object is to the right of the wearer. Volume of the audio signal may be adjusted to indicate proximity to an object with the volume increasing as the wear gets closer to the object. Additionally, relative volume among speakers may be set to provide more zones. For example, presenting an audio signal from the right front speaker 191B and the right rear speaker 191D where the volume is louder from right rear speaker generates a right side and back directional audio zone indicating a virtual object is to the right and back of the wearer, but not as far behind the wearer as when the signal is only presented by the right rear speaker 191D. In another example, the eyewear device 100 includes a left front speaker 191A adjacent the left ear and a right front speaker 191B adjacent the right ear. In accordance with this example, the audio processor applies HRTF modeling to the audio signals in order to provide directional information with the two speakers.

The eyewear device 100 includes a right optical assembly 180B with an image display to present images, such as depth images. As shown in FIGS. 1A and 1, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
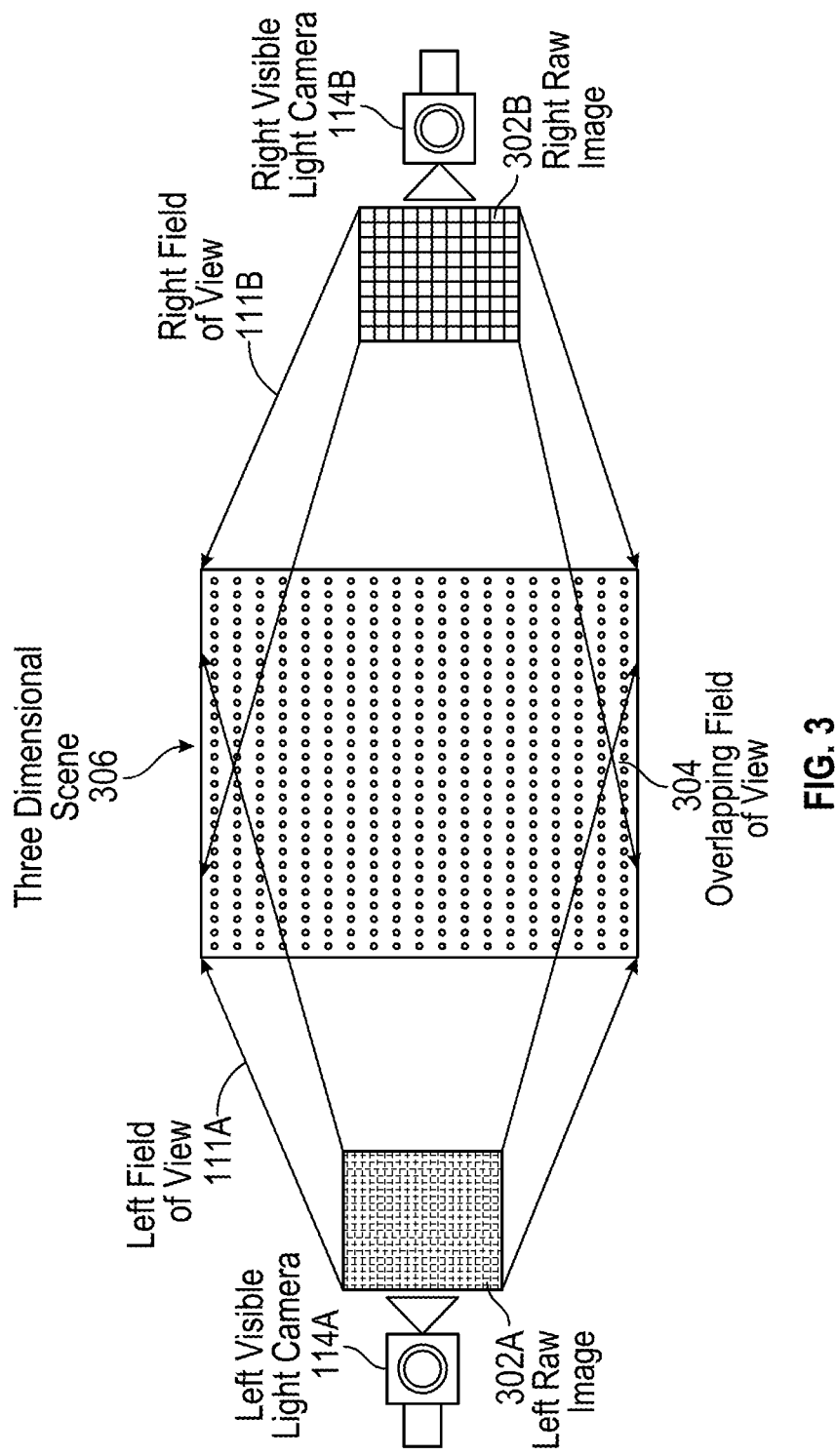
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible-light cameras 114A, 114B have a field of view with an angle of view between 15° to 110°, for example 24°, and have a resolution of 480×480 pixels or greater. The "angle of coverage" describes the angle range that a lens of visible-light cameras 114A, 114B or infrared camera 410 (see FIG. 4A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); and/or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geo-location data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, and/or a blue pixel light value); and a position attribute (e.g., an X-axis coordinate and a Y-axis coordinate).

In order to capture stereo images for later display as a three-dimensional projection, the image processor 412 (shown in FIG. 4A) may be coupled to the visible-light cameras 114A, 114B to receive and store the visual image information. The image processor 412 or another processor, which controls operation of the visible-light cameras 114A, 114B to act as a stereo camera simulating human binocular vision, may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, and/or a blue pixel light value); a position attribute (e.g., an X location coordinate, a Y location coordinate, and a Z location coordinate); a texture attribute and/or a reflectance attribute. The texture attribute quantifies the perceived texture of the depth image, such as the spatial arrangement of color or intensities in a region of vertices of the depth image.

In one example, the eyewear device 100 includes a frame 105, a left temple 110A extending from a left lateral side 170A of the frame 105, and a right temple 125B extending from a right lateral side 170B of the frame 105. The left camera 114A is connected to the frame 105, the left temple 125B, or the left corner 110A to capture a left raw image 302A from the left side of scene 306. The right camera 114B is connected to the frame 105, the right corner 110A, or the right temple 125B to capture a right raw image 302B from the right side of scene 306.

The left temple 110A has a proximal end adjacent a first side of the frame 105 and a distal end. The right temple 110B has a proximal end adjacent a second side of the frame 105 and a distal end. The left front speaker 191*a* is positioned adjacent the proximal end of the left temple 110A (e.g., on the left temple 110A, on the first/left side of the frame 105, or on the left corner 110A as illustrated). The right front speaker 191*b* is positioned adjacent the proximal end of the right temple 110B (e.g., on the right temple 110B, on the second/right side of the frame 105, or on the right corner 110B as illustrated). The left rear speaker 191*c* is positioned adjacent the distal end of the left temple 110A (e.g., on the left temple 110A as illustrated). The right rear speaker 191*d* is positioned adjacent the distal end of the right temple 110B (e.g., on the right temple 110B as illustrated).

Figure 1B:
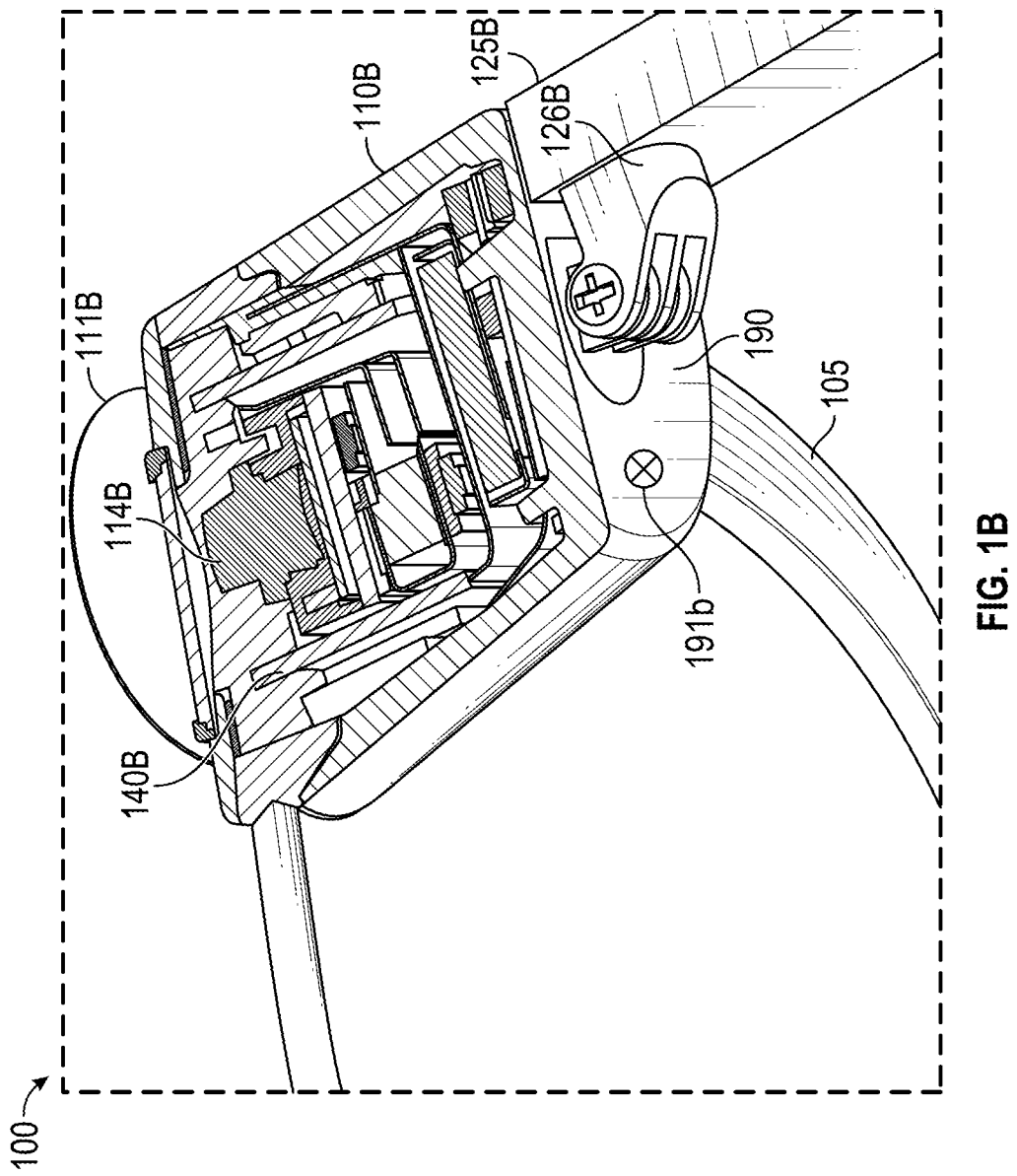
FIG. 1B is a top, partly sectional view of a right corner of the eyewear device of FIG. 1A depicting a right visible-light camera, and a circuit board.
Figure 1C:
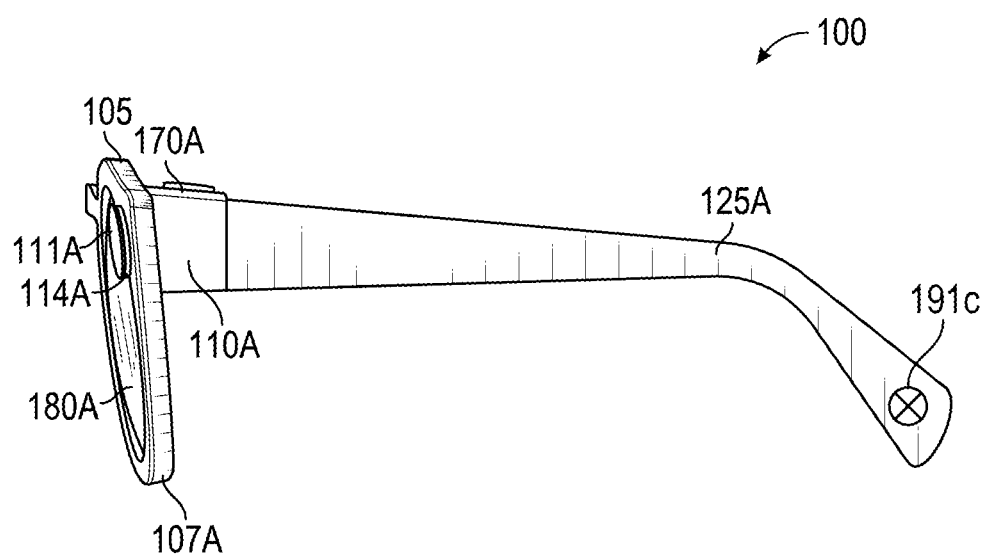
FIG. 1C is a side view (left) of an example hardware configuration of the eyewear device of FIG. 1A, which shows a left visible-light camera.
Figure 1D:
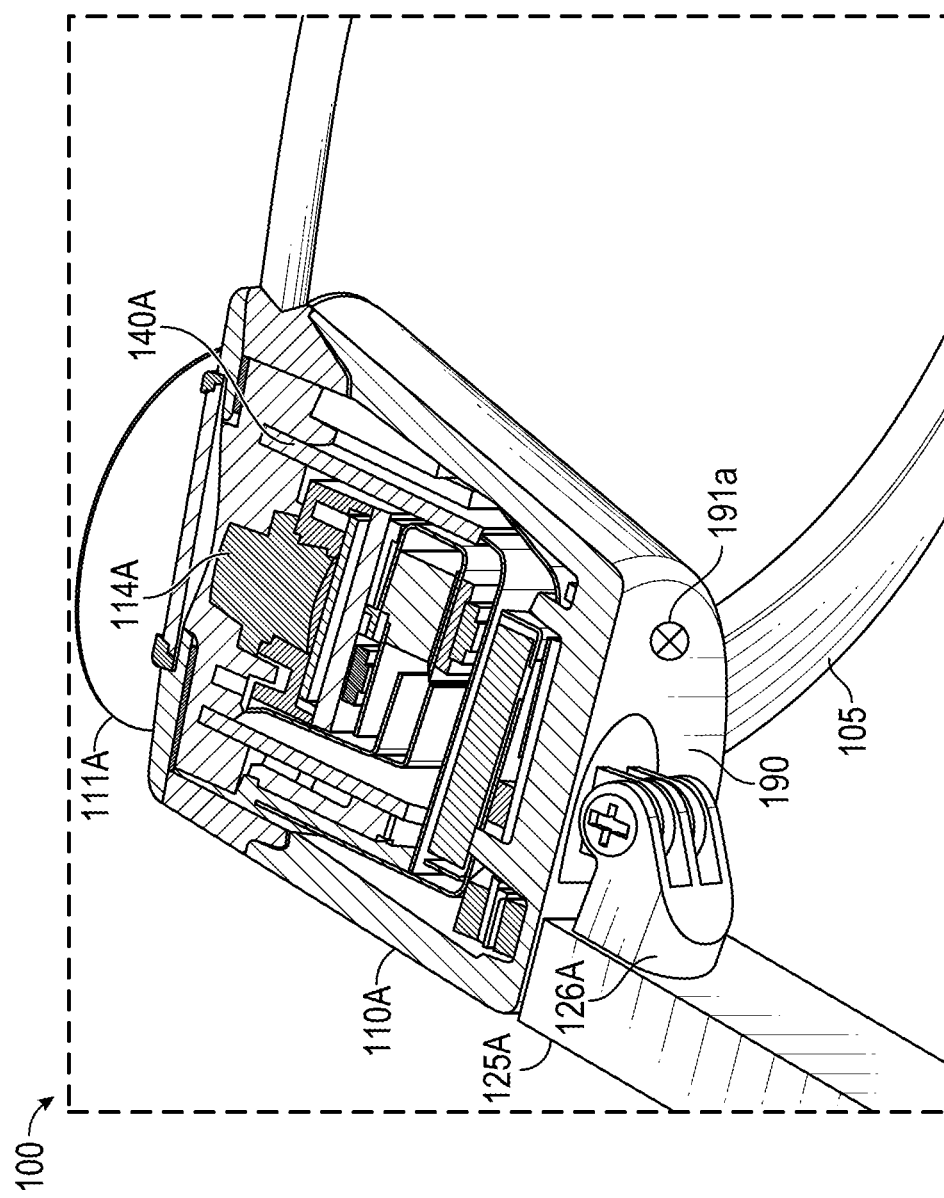
FIG. 1D is a top, partly sectional view of a left corner of the eyewear device of FIG. 1C depicting the left visible-light camera, and a circuit board.

FIG. 1B is a top cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a top cross-sectional view of a left corner 110A of the eyewear device of FIG. 1C depicting the left visible-light camera 114A of the three-dimensional camera, and a circuit board. Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). The right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via WiFi).

Figure 2A:
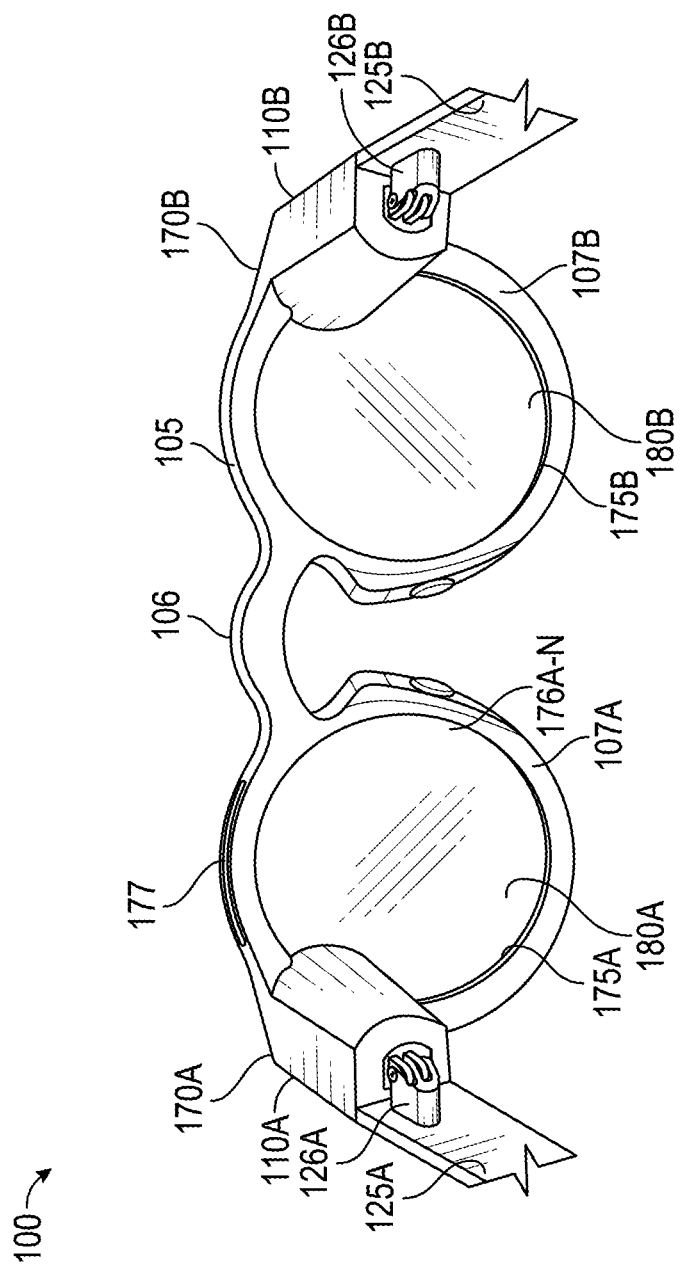
FIGS. 2A and 2B are rear views of example hardware configurations of an eyewear device utilized in an augmented reality system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
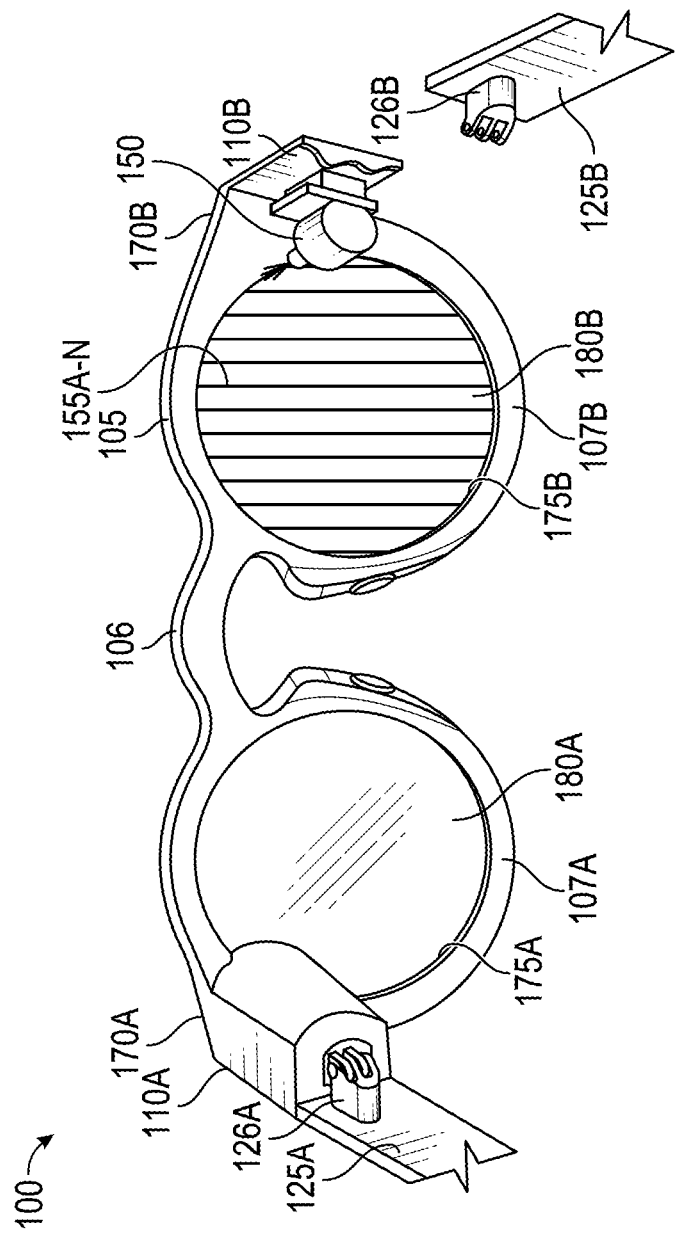

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved and/or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B and/or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) and/or a left set of optical strips 155'A, 155'B, . . . 155'N (155 prime, A through N, not shown) which are configured to interact with light from the left projector 150A. Similarly, the right optical assembly 180B may include a right display matrix 177B (not shown) and/or a right set of optical strips 155"A, 155"B, . . . 155"N (155 double-prime, A through N, not shown) which are configured to interact with light from the right projector 150B. In this example, the eyewear device 100 includes a left display and a right display.

Figure 4A:
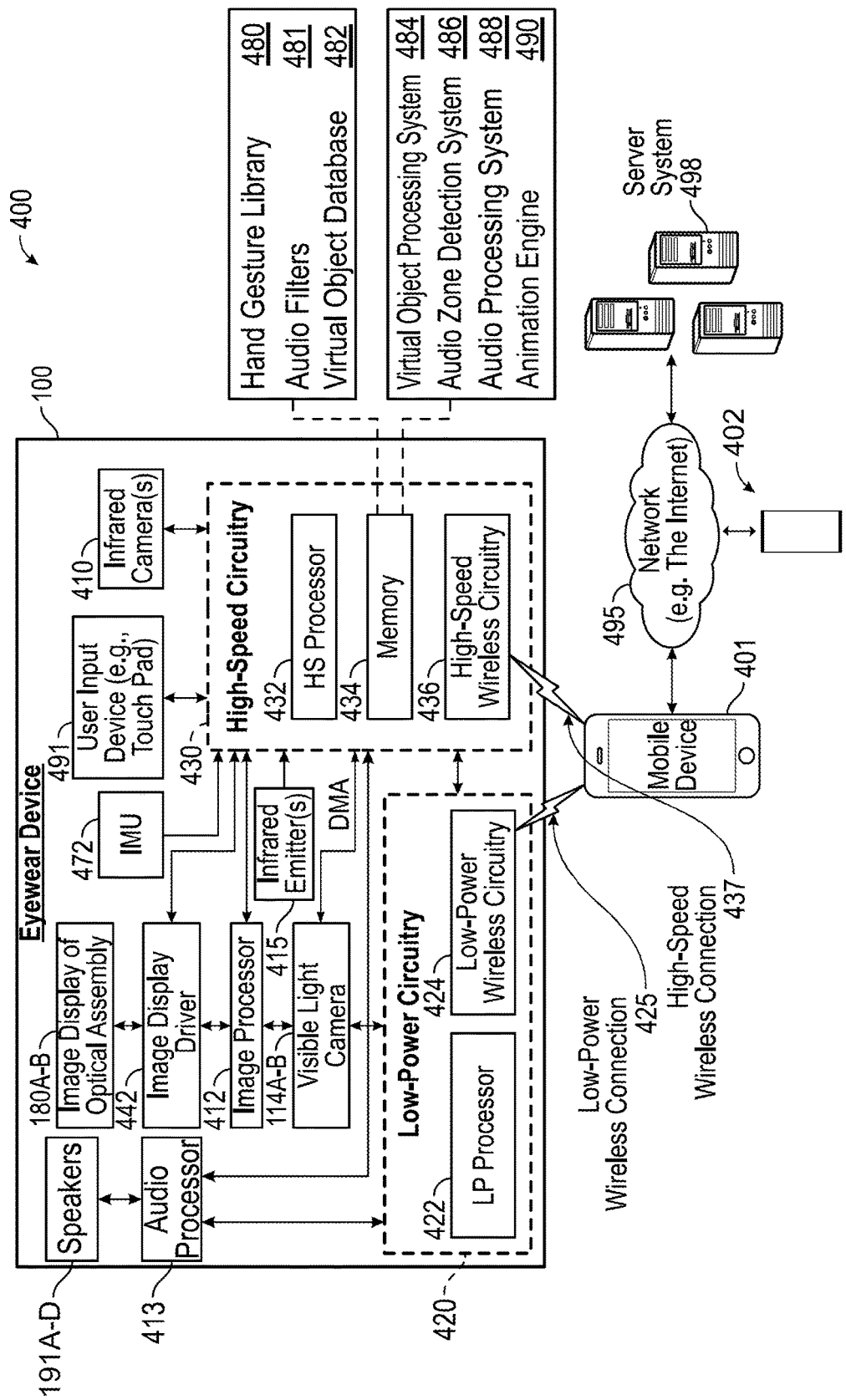
FIG. 4A is a functional block diagram of an example augmented reality system including a wearable device (e.g., an eyewear device), another electronic device, and a server system connected via various networks.

FIG. 4A is a functional block diagram of an example augmented reality system 400 including a wearable device (e.g., an eyewear device 100), another electronic device 402, a mobile device 401, and a server system 498 connected via various networks 495 such as the Internet. The system 400 includes a low-power wireless connection 425 and a high-speed wireless connection 437 between the eyewear device 100 and a mobile device 401—and, in some examples, as shown, between the eyewear device 100 and the other electronic device 402. The augmented reality system 400 additionally includes speakers 191a-d on the eyewear device 100 for guiding a user. The speakers 191a-d may be controlled directly via processor 432 or indirectly via an audio processor (not shown).

In one example, the other electronic device 402 is a remote device that may be a "smart device" (also referred to as an IoT device) including a power supply 652 (separate from that of the eyewear device), a microcontroller 656 or processor, a high-speed network connection 654, a memory 658, and physical output devices 662 (such as, for example, illumination sources, airflow sources, etc.) (shown in FIG. 4C).

As shown in FIG. 4A, the eyewear device 100 includes one or more visible-light cameras 114A, 114B that capture still images and/or video, as described herein. The cameras 114A, 114B may have a direct memory access (DMA) to high-speed circuitry 430 and function as a stereo camera. The cameras 114A, 114B may be used to capture initial-depth images for rendering three-dimensional (3D) models that are texture-mapped images of a red, green, and blue (RGB) imaged scene. The device 100 may also include a depth sensor, which uses infrared signals to estimate the position of objects relative to the device 100. The depth sensor in some examples includes one or more infrared emitter(s) 415 and infrared camera(s) 410. The cameras and the depth sensor are non-limiting examples of sensors in the eyewear device 100.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images and/or video. The image display driver 442 is coupled to the image displays of each optical assembly 180A, 180B in order to control the display of images.

The components shown in FIG. 4A for the eyewear device 100 are located on one or more circuit boards, for example, a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4A, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or WiFi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
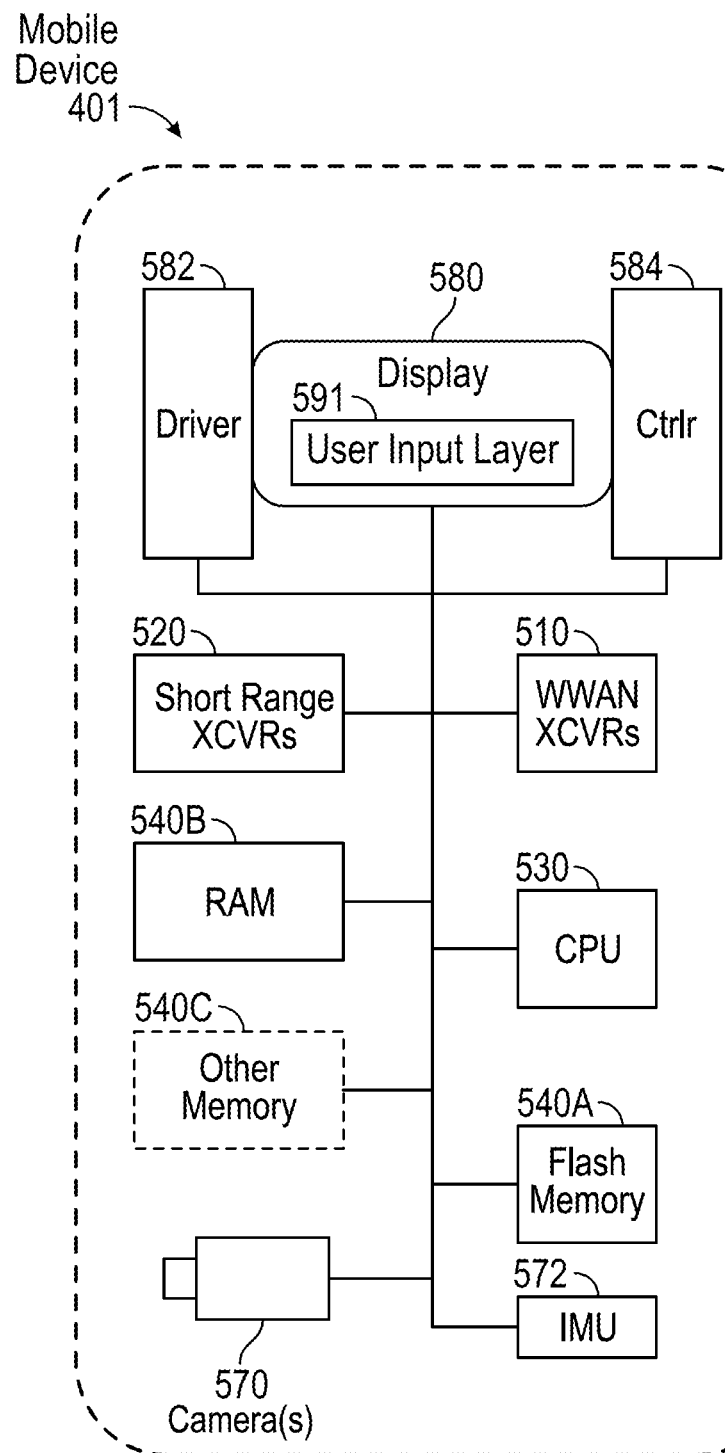
FIG. 5 is a diagrammatic representation of an example hardware configuration for a mobile device of the augmented reality system of FIG. 4A.

As shown in FIG. 4A, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The image displays may each have a display area that corresponds to the field of view obtained by the camera(s) 114.

The eyewear device 100 may include a user-facing indicator (e.g., an LED, a loudspeaker, or a vibrating actuator), and/or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), visual input (e.g., hand gestures captured via cameras 114A-B), and audio input components (e.g., a microphone), and the like. The mobile device 401 and the server system 498 may include alphanumeric, pointer-based, tactile, audio, visual, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. Additionally, or alternatively, the position of the eyewear device 100 may be determined by comparing images captured by, for example, cameras 114 and comparing those images to previously captured images having known positional information. Thus, the position of the device 100 may be determined by location sensors, such as image information gathered by cameras 114, a GPS receiver, one or more transceivers to generate relative position coordinates, altitude sensors or barometers, and/or other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The memory 434, in some example implementations, includes a hand gesture library 480. The library of hand gestures 480 includes poses and gestures, with the hand in various positions and orientations. The stored poses and gestures are suitable for comparison to a hand shape that is detected in an image. The library 480 includes three-dimensional coordinates for landmarks of the hand, e.g., from the wrist to the fingertips, for use in matching. For example, a hand gesture record stored in the library 480 may include a hand gesture identifier (e.g., pointing finger, closed fist, open palm, relaxed hand, grasping an object, pinching, spreading), a point of view or a directional reference (e.g., palmar side visible, dorsal, lateral), and other information about orientation, along with three-dimensional coordinates for the wrist, the fifteen interphalangeal joints, the five fingertips and other skeletal or soft-tissue landmarks. The process of detecting a hand shape, in some implementations, involves comparing the pixel-level data in one or more captured frames of video data to the hand gestures stored in the library 480 until a match is found, e.g., by applying a machine vision algorithm. A match may be determined when a predefined confidence threshold set in the machine vision algorithm is exceeded.

The memory 434 additionally includes, in some example implementations, audio filters 481, a virtual object database 482, a virtual object processing system 484, an audio zone detection system 486, and an audio procession system 488. The virtual object database 482 includes information associated with virtual objects. In one example, the virtual object database 482 includes audio information (e.g., an audio track) and visual information (e.g., images for creating appearance).

The virtual object processing system 484 generates instructions for presenting virtual objects on the image display of optical assembly 180A-B and controlling movement of the virtual objects. The virtual object processing system 484 additionally calculates information associated with the virtual object such as its position, directional velocity, and distance with respect to the user. The audio zone detection system 486, generates instructions for detecting which zone the virtual object is currently in with respect to the head of a user. In one example the audio zone detection system 484 maintains a map (see FIG. 8A) representing the zones surrounding a head of a user for use in zone detection. The audio processing system 488 generates instructions for applying HRTF filters to the audio tracks of the virtual objects responsive to their current position and presenting sound to the user via audio processor 413 and speakers 191.

The memory 434 may additionally include an image capture application, a localization system, and an image processing system. Where a camera of eyewear device 100 is capturing frames of video data, the image capture application configures the processor 432 to detect a hand shape (e.g., a pointing index finger). The localization system configures the processor 432 to obtain localization data for use in determining the position of the eyewear device 100 relative to the physical environment. The localization data may be derived from a series of images, an IMU 472, a GPS unit, or a combination thereof. The image processing system configures the processor 432 to present a captured still image on a display of an optical assembly 180A-B in cooperation with the image display driver 442 and the image processor 412.

In some examples, the devices 100, 401, 402 illustrated in FIG. 4A are configured to cooperate and share the processing demand when performing any of the functions described herein. For example, the other electronic device 402, may be configured to detect an interaction, such as a wireless signal from the device 100, and process the interaction to determine relative proximity. If within a predefined range, the electronic device 402 sends an application programming interface (API) to the eyewear device 100, at which point the eyewear device 100 takes over the task of performing additional functions. Additional functions may also be performed by the mobile device 401. In this aspect, the augmented reality system 400 distributes, shares, and manages the processing demand such that the functions described herein are performed efficiently and effectively.

The augmented reality system 400, as shown in FIG. 4A, includes a computing device, such as mobile device 401, coupled to an eyewear device 100 and another remote electronic device 402 over a network. The augmented reality system 400 includes a memory for storing instructions and a processor for executing the instructions. Execution of the instructions of the augmented reality system 400 by the processor 432 configures the eyewear device 100 to cooperate with the other electronic device 402 and/or the mobile device 401. The system 400 may utilize the memory 434 of the eyewear device 100 and/or the memory elements 540A, 540B, 540C of the mobile device 401 (FIG. 5) and/or the memory 630 of the other electronic device 402 (FIG. 6). Also, the system 400 may utilize the processor elements 432, 422 of the eyewear device 100 and/or the central processing unit (CPU) 540 of the mobile device 401 (FIG. 5) and/or the microprocessor 656 of the other electronic device 402. In addition, the system 400 may further utilize the memory and processor of the server system 498. In this aspect, the memory and processing functions of the augmented reality system 400 can be shared or distributed across the eyewear device 100, the mobile device 401, the other electronic device 402, and/or the server system 498.

Figure 4B:
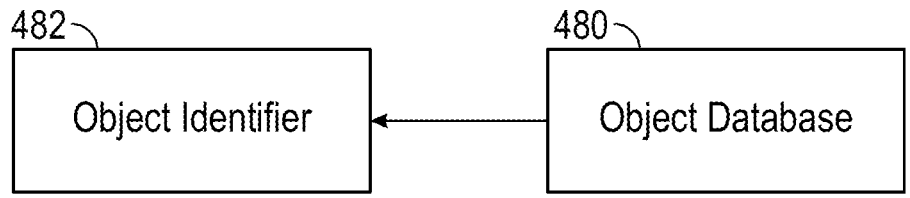
FIG. 4B is a flow diagram of an aspect of an augmented reality system.
Figure 4C:
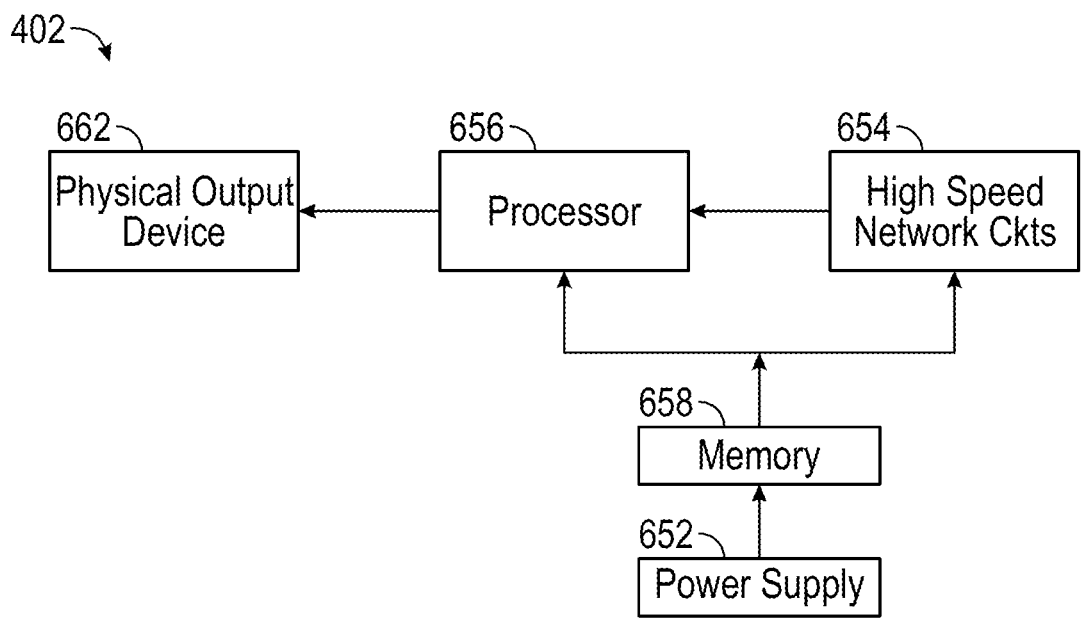
FIG. 4C is a functional block diagram of a "smart component" for use in one example of the augmented reality system.

In some examples, a portion of the memory 434 is used to store an object database 480 (see FIG. 4B) while another portion of the memory 434 has programming stored therein, which when executed by the processor 432 provides an object identifier 482 (see FIG. 4B). The flowchart shown in FIG. 4B illustrates such an example.

In some examples, the object database 480 is initially stored in a memory of the server system 498 and the memory 434 has programming stored in, which when executed by the processor 432 causes the eyewear device to access the server system 498, retrieve all or a portion of the object database 480 from the server system 498 and store the retrieved object database 480 in the memory 434.

FIG. 5 is a high-level functional block diagram of an example mobile device 401. Mobile device 401 includes a flash memory 540A that stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. The structure and operation of the touchscreen-type devices are provided by way of example and the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus or other tool) and an image display 580 for displaying content.

As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™ or WiFi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include image-based location systems and a global positioning system (GPS) receiver. Alternatively, or additionally, the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 5. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. Suitable algorithms including particle filter, Kalman filters, extended Kalman filter, and covariance intersection methods. Algorithms that apply machine learning in SLAM are also within the scope of these teachings. Additionally, the processor 432 may identify an object location (associated with a location, a physical object, or a virtual object) and guide the user of the eyewear device 100 toward the object location using audio signal presented by speakers of the eyewear device 100.

Sensor data includes images received from one or both of the cameras 114A-B, distance received from a laser range finder, position information received from a GPS unit, or a combination of two or more of such sensor or other sensor providing data useful in determining positional information.

Figure 6A:
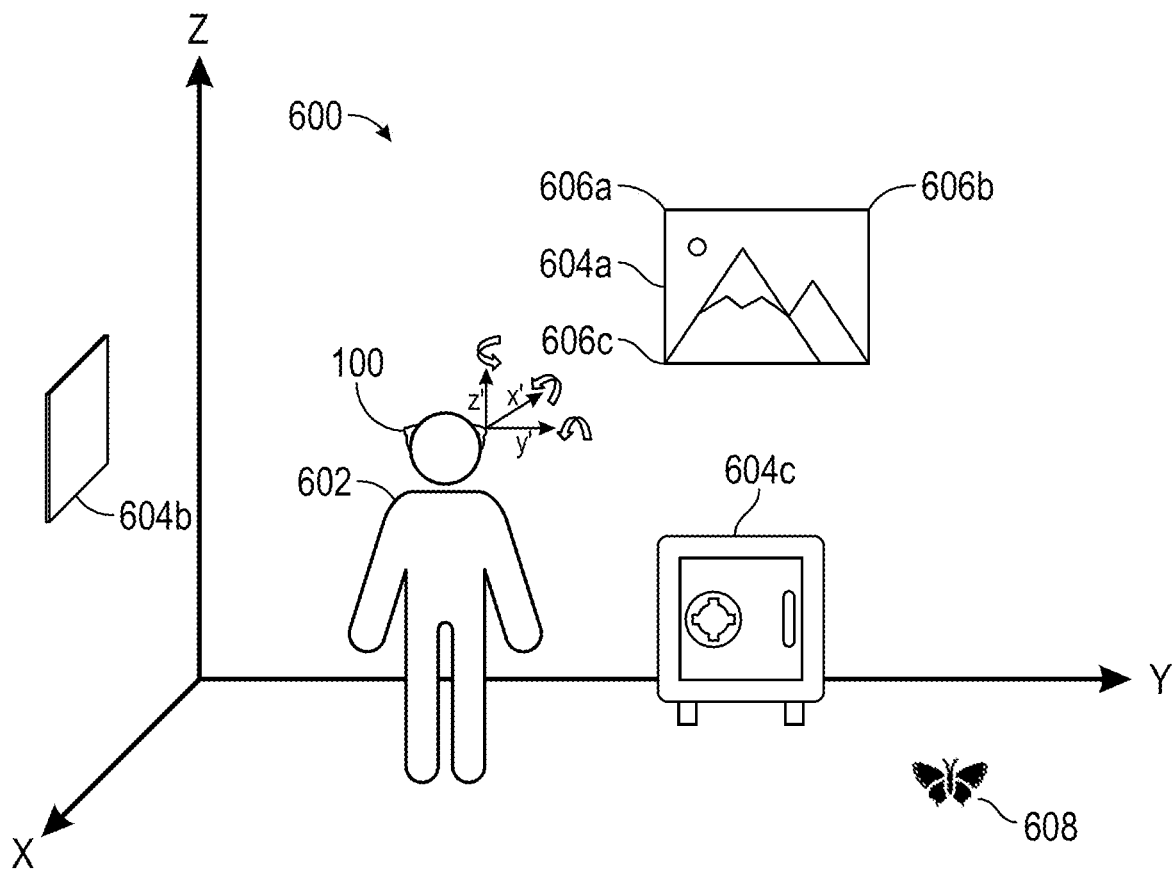
FIGS. 6A and 6B are illustrations for use is describing natural feature tracking, simultaneous localization and mapping, and spatial audio.

FIG. 6A depicts an example environment 600 from a rear perspective for implementing natural feature tracking (NFT) and SLAM processing. A user 602 of the eyewear device 100 is present in the environment 600 (which is a room in FIG. 6). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (position, roll, pitch, and yaw) of the eyewear device 100 within the environment by using two or more location points (e.g., three location points 606a, 606b, and 606c) on one or more objects 604 or by using one or more location points 606 on two or more objects 604. The processor 432 of the eyewear device 100 may position virtual objects (e.g., butterfly 608) within the environment for augmented reality viewing via image displays 180.

Figure 6B:
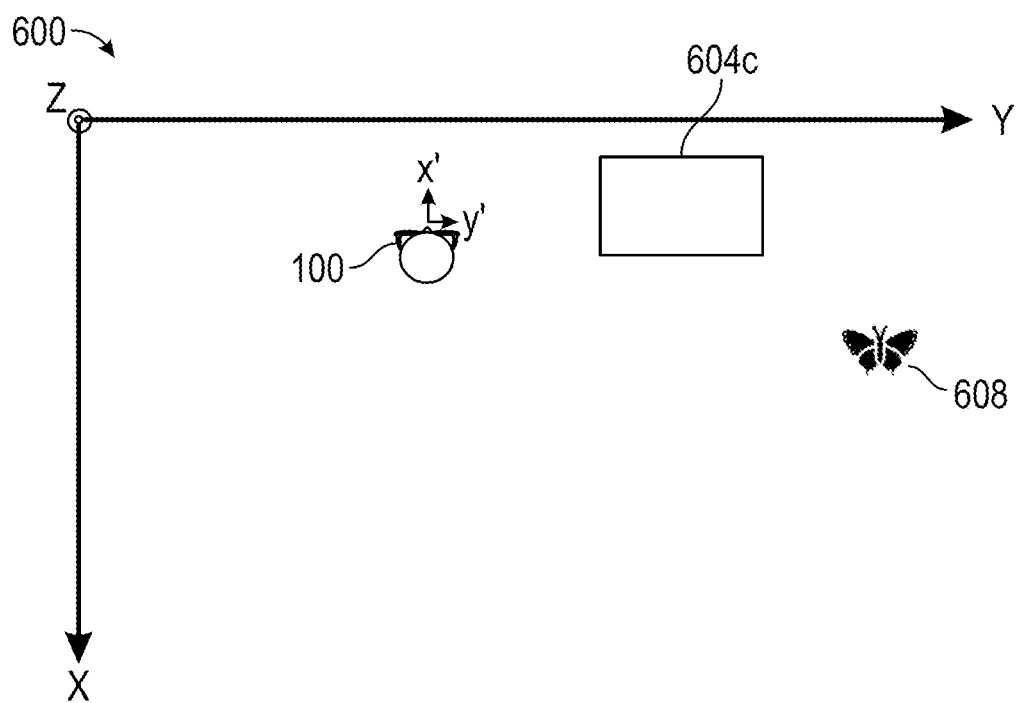

FIG. 6B depicts the example environment 600 from a top perspective. As shown in the top perspective, the physical safe 604c is to the front right side of the user wearing the eyewear device 100 and the virtual butterfly 608 is to the rear right side of the user. Both objects 604c/608 are outside the field of view/display area of the eyewear device 100 when facing substantially along the x-axis. As described below, the eyewear device 100 emits audio signals via the speakers 191 to guide the user 602 to an object location, such as the location of the virtual butterfly 608.

Figure 7A:
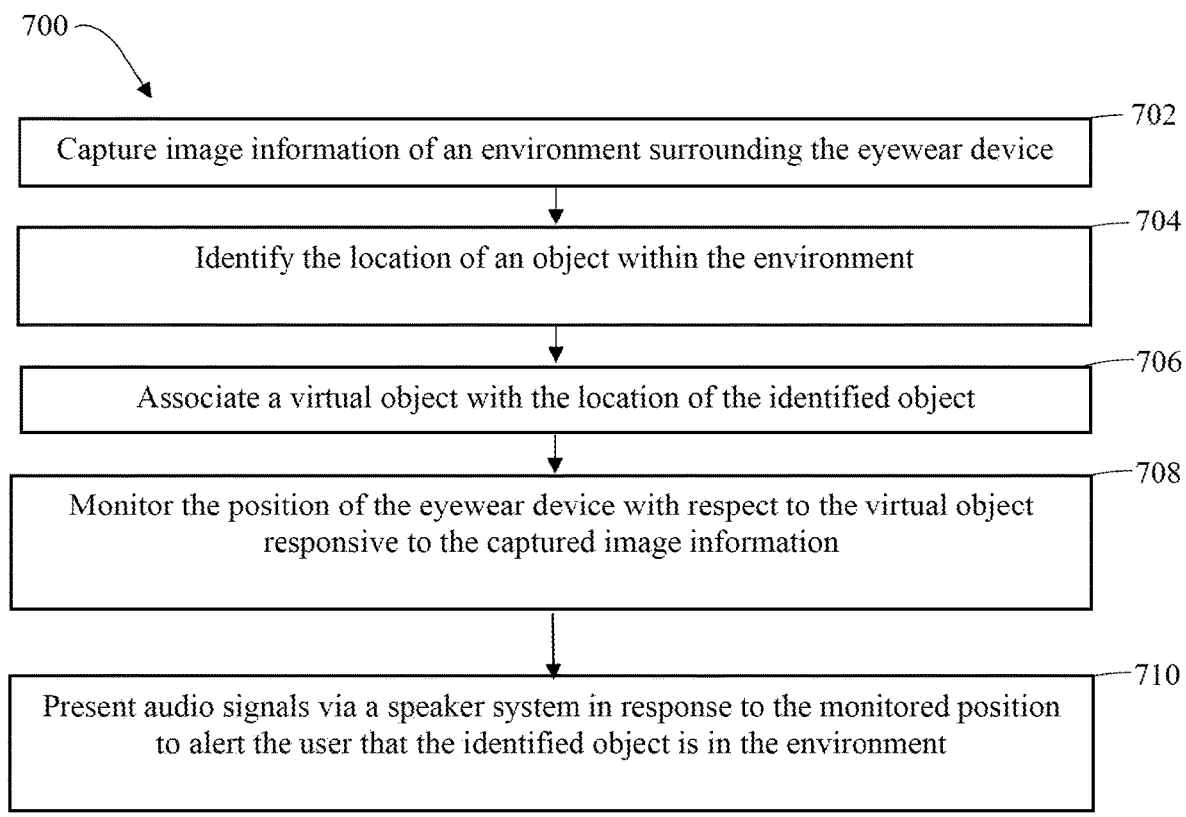
FIGS. 7A, 7B, 7C, 7D, 7E, and 7F are flowcharts of an example method for providing a physical output that varies as the position of the eyewear device changes.

FIG. 7A shows flow chart 700 depicting an example method for implementing an immersive augmented reality experience using an eyewear device with spatial audio. Although the steps are described with reference to the eyewear device 100, as described herein, other implementations of the steps described, for other types of devices, will be understood by one of skill in the art from the description herein. Additionally, it is contemplated that one or more of the steps shown in FIG. 7A, and described herein, may be omitted, performed simultaneously and/or in a series, performed in an order other than illustrated and described, and/or performed in conjunction with additional steps.

In the example method depicted in flow chart 700, the eyewear device captures image information for an environment surrounding the device and identifies an object location within the same environment. The eyewear device associates a virtual object with the identified object location. The eyewear device monitors the position of the device with respect to the virtual object and presents audio signals to alert the user that the identified virtual object is in the environment.

At block 702, the eyewear device 100 captures images of the environment 600 surrounding the eyewear device 100 using at least one sensor, for example visible light camera(s) 114. The processor 432 may continuously receive images from the visible light camera(s) 114 and store those images in memory 434 for processing. Additionally, the eyewear device may capture information from other sensors, e.g., location information from a GPS sensor and/or distance information from a laser distance sensor.

At block 704, the processor 432 of the eyewear device 100 identifies the location of one or more objects 604 within the environment 600 using captured images. The processor 432 may compare object image data from the captured images stored in memory 434 to object image data of known objects in the object database 480 (FIG. 4B) to identify a match using the object identifier 482 (FIG. 4B), e.g., implementing a conventional object recognition algorithm or a neural network trained to identify objects. In one example, the processor 432 is programmed to identify a predefined particular object (e.g., a particular picture 604a hanging in a known location on a wall, a window 604b in another wall, and/or a heavy object such as a safe 604c positioned on the floor). Other sensor data, such as GPS data, may be used to narrow down the number of known objects for use in the comparison (e.g., only images associated with a room identified through GPS coordinates). In another example, the processor 432 is programmed to identify predefined general objects (such as one or more trees within a park). The eyewear device 100 determines its position with respect to the object(s) (i.e., location and optionally orientation). The eyewear device 100 may determine its position with respect to the objects by comparing and processing distances between two or more points in the captured images (e.g., between two or more location points on one objects 604 or between a location point 606 on each of two objects 604) to known distances between corresponding points in the identified objects. Distances between the points of the captured images that are greater than the points of the identified objects indicate the eyewear device 100 is closer to the identified object than the imager that captured the image including the identified object. On the other hand, distances between the points of the captured images that are less than the points of the identified objects indicate the eyewear device 100 is further from the identified object than the imager that captured the image including the identified object. By processing the relative distances, the processor 432 is able to determine the position (i.e., location and orientation) within respect to the objects(s). Alternatively, or additionally, other sensor information, such as laser distance sensor information, may be used to determine position with respect to the object(s). For location, the eyewear device 100 constructs a map of an environment 600 surrounding the eyewear device 100 and determines its location within the environment. In one example, where the identified object (block 704) has a predefined coordinate system (x, y, z), the processor 432 of the eyewear device 100 constructs the map using that predefined coordinate system and periodically determines its location within that coordinate system with respect to the identified objects. In another example, the eyewear device constructs a map using images of permanent or semi-permanent objects 604 within an environment (e.g., a tree or a park bench within a park). In accordance with this example, the eyewear device 100 may define the coordinate system (x', y', z') used for the environment. The eyewear device 100 may periodically determine its location through NFT and SLAM processing. Additionally, or alternatively, other techniques may be used to determine location such as GPS signals receive by a GPS receiver. For orientation, the eyewear device 100 determines a head pose (roll, pitch, and yaw) of the eyewear device 100 within the environment, e.g., also through SLAM processing. The processor 432 may determine head pose by using two or more location points (e.g., three location points 606a, 606b, and 606c) on one or more objects 604 or by using one or more location points 606 on two or more objects 604. Using conventional image processing algorithms, the processor 432 determines roll, pitch, and yaw by comparing the angle and length of lines extending between the location points for the for the captured images and the known images. The eyewear device 100 may periodically determine its orientation through NFT and SLAM processing. Additionally, or alternatively, other technique may be used to determine orientation such as through signals receive from IMU 472.

At block 706, associate a virtual object with the object location and determine when the object location is within the device's field of view/display area. The processor 432 may determine when the object location is within the field of view of the eyewear device 100 by comparing the angular position to a range associated with the device's field of view, e.g., −15 degrees to +15 degrees. When the object location is within the field of view of the eyewear device 100, the processor 432 presents an image overlay including the virtual object via a display of the eyewear device 100 using the image processor 412 and the image display driver 442 of the eyewear device 100. The processor develops and presents the visual images via the image displays responsive to the location of the eyewear device 100 within the environment 600. As the eyewear device 100 moves through the environment, the processor 432 updates the image overlay on the optical assemblies 180 such that the virtual object appears at the object location while the object location is within the field of view. When the object location moves out of the field of view, the virtual object is no longer presented. The presented virtual object has a virtual position in three-dimensional space, which the virtual object process system 484 tracks in relation to the location of the identified object. In one example, the virtual position in three-dimensional space is substantially perceived by the user to be associated with an x-y plane appearing to lie on a surface (e.g., the ground, floor, countertop, etc.). In one example, the visual images include an image of a hand 1002 for manipulating features of a GUI (FIG. 9) or selecting a virtual object such as a virtual butterfly 1004 (FIG. 10).

At block 708, processor 432 monitors the position of the eyewear device with respect to the location of the virtual object in response to image information captured by at least one sensor. The device determines a current position (direction and optionally distance) of a virtual object with respect to the head of the user where the virtual object has an associated audio track. The current position includes a direction with respect to the head of the user. The current position may additionally include a distance with respect to the head of the user. In one example, the direction and distance are represented by a vector the virtual object processing system 484 calculates that intersects a position associated with the head of the user and the virtual position of the virtual object tracked by the virtual object processing system 484.

The processor 432 may monitor the orientation of the eyewear device 100 as described above for determining orientation as a part of determining position and compare the current orientation to the virtual object location using a geometric algorithm to obtain an angular position. The angular position represents a relative position of the eyewear device 100 to the object location and is associated with a directional audio zone, e.g., the object location is to the right of the eyewear device (e.g., angular position of 67.5 degree to 112.5 degrees; directional audio zone 1), to the right and back of the eyewear device 100 (e.g., angular position of 112.5 degrees to 167.5 degrees; directional audio zone 2), or behind the eyewear device 100 (e.g., angular position of 167.5 degrees to 102.5 degrees; directional audio zone 3). The processor 432 stores the directional audio zones for the angular ranges in memory 434, e.g., in a lookup table.

In some examples, eyewear device 100 is operatively connected, for example, by wireless connection 425, 437 via mobile device 401 and network 495, to server system 498, and the monitored position or the virtual position, the virtual object, or a combination thereof, are stored in another memory in the server system for retrieval by one or more other users. In another example, the location of the virtual object may be shared via wireless connection 425, 437 of eyewear device 100, such as via short-range transceivers (Bluetooth™ or Bluetooth Low-Energy (BLE)) or wireless wide, local, or wide-area network transceivers (e.g., cellular or WiFi) between eyewear devices 100 worn by other users.

At block 710, the eyewear device 100 presents audio signals in response to its position in the environment to alert the user that the identified virtual object is in the environment. The processor 432 presents the audio signals selectively through speakers 191 of the eyewear device 100 based on the current orientation of the eyewear device 100 with respect to the object location. In one example, the processor 432 determines a current orientation of the eyewear device 100. The current orientation may be represented as an angular position. The processor 432 selects one of the directional audio zones, e.g., by comparing the angular position to angular ranges associated with each of the directional audio zones and selecting the directional audio zone associated with a range containing the angular position. For example, if the angular position is 90 degrees (indicating the object location is to the right of the eyewear device 100), the processor 432 will select audio zone 1. The processor 432 presents the audio signal by selectively presenting the audio signal via the speakers 191 responsive to the orientation. For example, if directional audio zone 1 is selected due to an angular position of 90 degrees, the processor 432 emits the audio signal via both speakers on the right side of the eyewear device 100.

Additionally, the processor 432 or audio processor 413 may adjust the volume of the audio signal responsive to the relative location between the current location of the eyewear device 100 and the virtual object location. For example, if the virtual object location is relatively far away, e.g., 20 feet, the volume may be reduced such that it is very low or inaudible. As the eyewear device 100 moves closer to the virtual object location, the processor 432 increases the volume, thereby providing an indication to the user that they are getting closer to the virtual object location. As the eyewear device 100 moves away from the virtual object location, the processor 432 decreases the volume, thereby providing an indication to the user that they are moving away from the virtual object location. In one example, the decibel level or volume of the audio signals increases exponentially as the monitored position of the eyewear device approaches the virtual object. In another example, the decibel level of the audio signals decreases logarithmically as the monitored position of the eyewear device moves away from the virtual object.

The steps described above with reference to blocks 702-710 are repeated to update the position of the eyewear device 100 and adjust the presentation of the audio signal and the virtual object as the eyewear device 100 moves through the environment 600 to guide the user to the virtual object location.

Figure 7B:
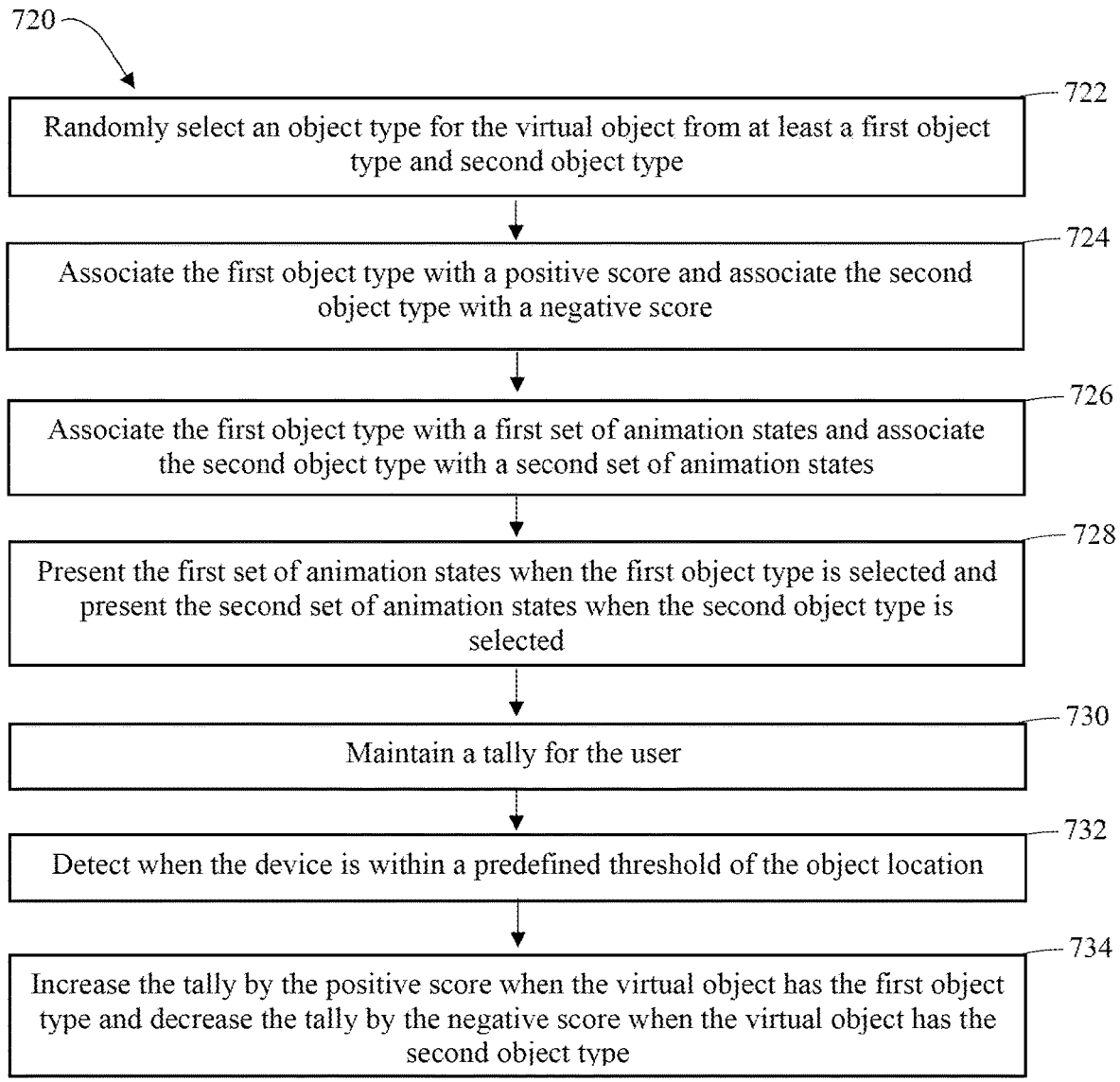

FIG. 7B is a flow diagram depicting a method 720 for implementing augmented reality applications described herein on a wearable device (e.g., an eyewear device).

At block 722, processor 432 randomly selects from at least two virtual objects, a first object type and second object type, from object database 480 in memory 434. The object types may be various forms, and in some examples the first and second object types are dichotomous, for example, the first object type is a "good" character (e.g., butterfly, spirit, etc.) and the second object type is an "bad" character (e.g., owl, wolf, raven, etc.). Other object types may be used such money, gemstones, and the like. First and second object types may have different associated audio tracks.

At block 724, the first object type is associated with a positive score and the second object type is associate with a negative score. For example, a butterfly may be selected for the first object type and an owl may be selected for the second object type, each type randomly selected from object database 480, and the butterfly is associated with a positive score and the owl is associated with a negative score. Points may be awarded as butterflies are acquired and lost with interaction with the owls.

At block 726, the first object type is associated with a first set of animation states and the second object type is associated with a second set of animation states. The states of an animation may be altered or controlled by the monitored position of the device. For example, as the device moves closer to the virtual object (i.e., the distance between the device and the location of the virtual object because shorter), the animation state may change. In some examples the change may relate to the frequency of movement, whether the overall frame of the object moves (e.g., jumps, swivels, etc.), or changes its appearance. The animation state may have a theme, for example, nature, space, urban, and fantasy. In an example where the animation state has a nature theme, its appearance may change to display a whirlwind effect or breeze, etc. In some examples each theme has associated audio tracks to provide ambient audio.

At block 728, presenting the first set of animation states when the first object type is selected and present the second set of animation states when the second object type is selected. Processor 432 retrieves first and second animation states from an animation engine 490 in memory 434 and displays the respective virtual object with its respective animation state upon selection and depending on the position of the eyewear device with respect to the virtual object in response to the captured image information (block 708).

At block 730, the processor 432 is programmed to retrieve positive and negative scores stored in memory (block 724) and calculate and maintain a tally, e.g., in memory responsive to the wearer's movement within the environment.

At block, 732, the processor 432 continues monitoring the position of the eyewear device (block 708) and detects when the eyewear device is within a predefined threshold of the object location. Processor 432 monitors the current position (e.g., direction and distance) of the eyewear device 100 with respect to a virtual object. The eyewear device determines a directional velocity of the virtual object with respect to the head of the user. The system determines the directional velocity by monitoring movement of the current position of the virtual object over time. In one example, the virtual object processing system 484 periodically (e.g., every 10 ms) calculates the current position of the virtual object. The virtual object processing system 484 then calculates a directional component between a prior (e.g., an immediately prior) position of the virtual object and a current position where the directional component is along a line extending between the origin associated with the head of the user and a position adjacent the virtual object to obtain a relative velocity of the object with respect to the user.

At block 734, the eyewear device 100 adjusts the tally (block 730). In one example, the eyewear device 100 increases the tally by the positive score when the virtual object has the first object type if the threshold value in block 732 is met and, optionally, decreases the tally by the negative score when the virtual object has the second object type. In another example, the eyewear device 100 monitors a hand gesture of the wearer identified in captured images (e.g., a pointing finger) and the image processor 412 determines the position of the gesture with respect to the virtual object. In accordance with this example, the eyewear device 100 increases the tally by the positive score when the gesture is on or adjacent the virtual object of the first object type and, optionally, decreases the tally by the negative score when the gesture is on or adjacent the virtual object of the first object type.

Figure 7C:
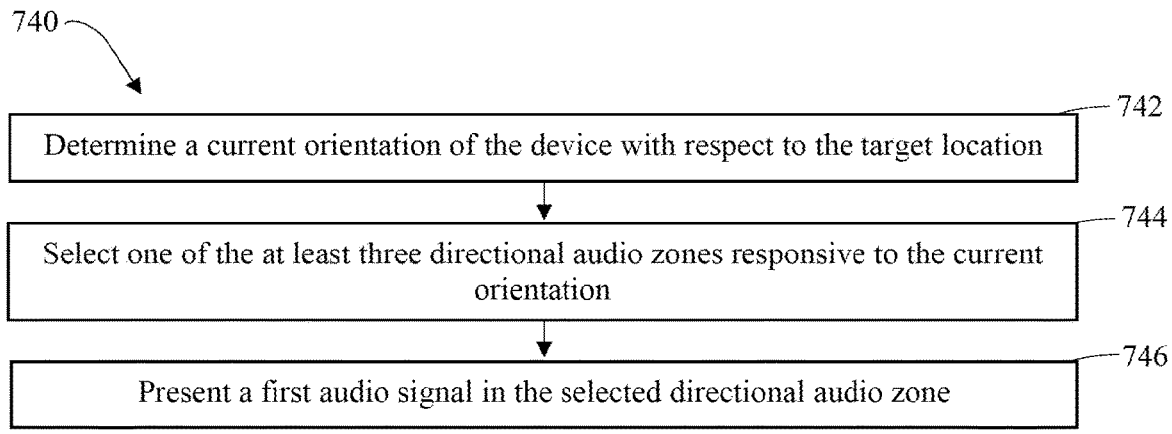

In another example, two users may compete with each other to score points in environment 600 by performing the steps depicted in flow charts 700 and 720, and optionally 740 shown in FIGS. 7A-7C. Eyewear device 100 is operatively connected, for example, by wireless connection 425, 437 via mobile device 401 and network 495, to server system 498, and the monitored position or the virtual position, the virtual object, or a combination thereof, are stored in another memory in the server system for retrieval by one or more other users. In another example, the location of the virtual object may be shared via wireless connection 425, 437 of eyewear device 100, such as via short-range transceivers (Bluetooth™ or Bluetooth Low-Energy (BLE)) or wireless wide, local, or wide-area network transceivers (e.g., cellular or WiFi) between eyewear devices 100 worn by other users.

FIG. 7C is a flow chart 740 depicting another example of a method for implementing augmented reality applications described herein on a wearable device (e.g., an eyewear device). At block 742, eyewear device 100 determines its current orientation with respect to the object location, selects one of the at least three directional audio zones in response to the current orientation 744, and presents a first audio signal in the selected directional audio zone 746.

Figure 7D:
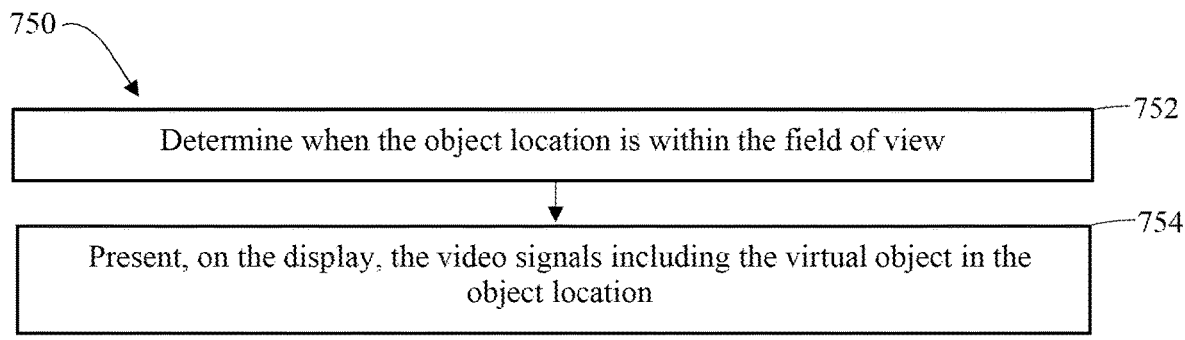

FIG. 7D is a flow chart 750 depicting another example of a method for implementing augmented reality applications described herein on a wearable device (e.g., an eyewear device). At block 752, the eyewear device 100 determines when the object location is within the field of view, and at block 754, the eyewear device presents on the display the virtual object in the object location within the field of view.

Figure 7E:
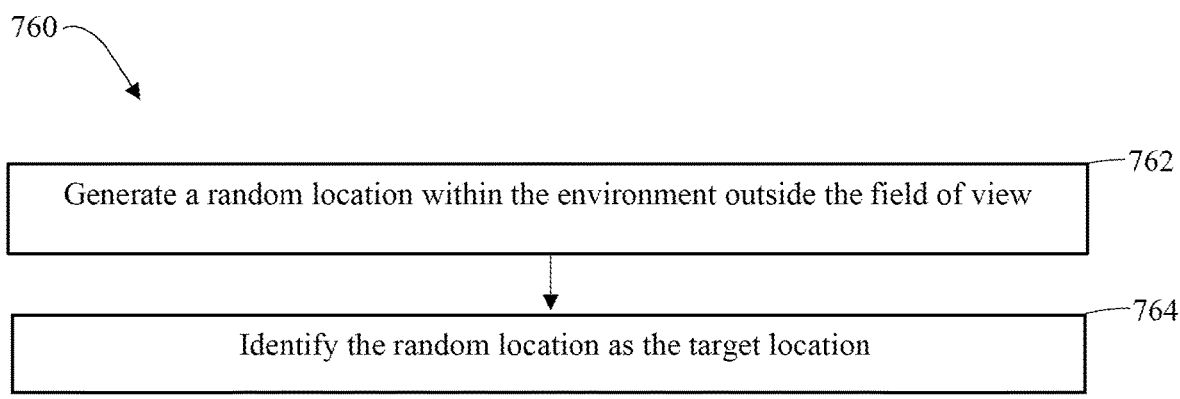

FIG. 7E is a flow chart 760 depicting another example of a method for implementing augmented reality applications described herein on a wearable device (e.g., an eyewear device). At block 762, the eyewear device 100 generates a random location for the position of the virtual object within the environment outside the field of view. The location may be a random location selected from locations within the environment that are outside the field of view of the eyewear device 100 and/or are hidden behind or in physical objects, in which case the processor 432 may apply a pseudo random number generation algorithm to locations meeting predefined criteria to identify the object location. In some examples, the predefined criteria include ensuring the virtual object appears to be at rest on a surface, for example, the ground, countertop, etc. At block 764, the eyewear device 100 identifies the random location as the object location.

Figures 7F, 8A:
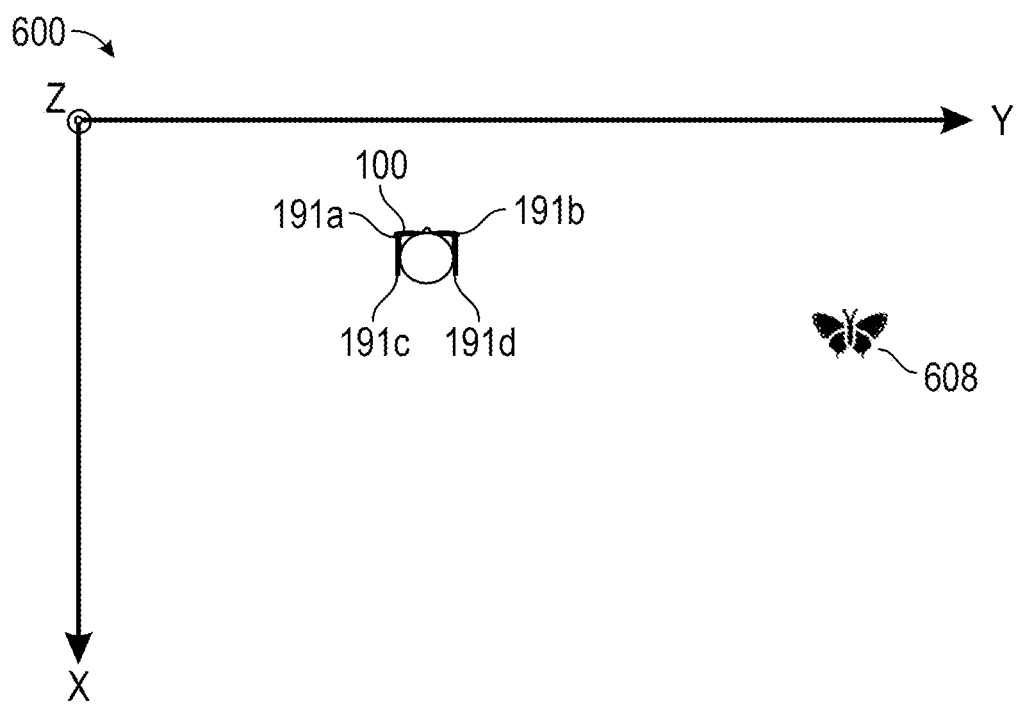
FIGS. 8A, 8B, and 8C are illustrations depicting an example use of the eyewear device.

FIG. 7F is a flow chart 770 depicting another example of a method for implementing augmented reality applications described herein on a wearable device. At block 772, the eyewear device 100 determines a change in position of the eyewear device in relation to the virtual object in which the virtual object has a first animation state. At block 774, the eyewear device 100 generates a second animation state for the virtual object in response to the change in position.

FIGS. 6A, 6B, 8A, 8B, and 8C are images for use in describing one example. In the example shown in FIGS. 6A, 6B, 8A, 8B, and 8C, a user 602 wearing an eyewear device 100 enters an environment (e.g., a room in the illustrated example). The eyewear device 100 captures images within the environment. The eyewear device 100 identifies objects/features within the images such as a picture 604a and a window 604b. Using NFT and SLAM processing, the eyewear device 100 determines its position (location/orientation) within the environment with respect to the object/features. The eyewear device 100 additionally determines an object location, e.g., a location within the environment that may be associated with a virtual object such as a virtual butterfly 608. Using the techniques described herein eyewear device 100 guides the user to the virtual object location by selectively emitting audio signals from speakers 191a-d positioned on the eyewear device 100 to generate directional audio zones.

Figure 8B:
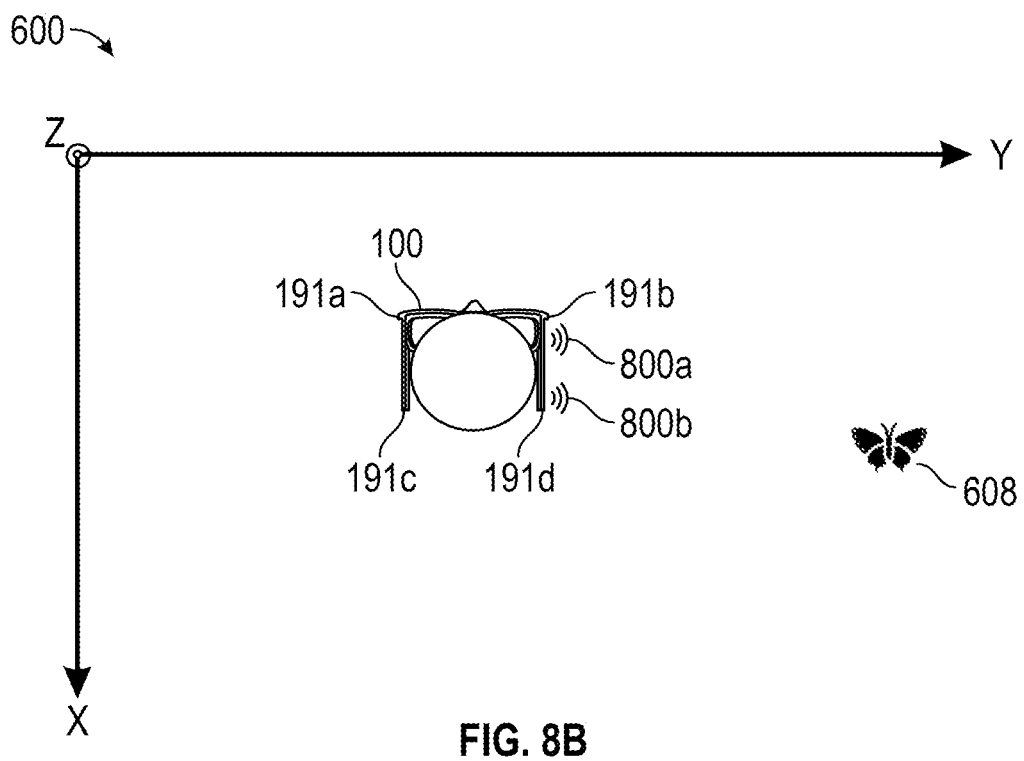

In FIG. 8B, the virtual object location is directly to the right of the eyewear device 100. The eyewear device 100 determines the angular position of the eyewear device 100 with respect to the virtual object location and selects a directional audio zone associated with speakers 191b and 191d causing speakers 191b and 191d to emit audio signals 800a and 800b, respectively. The user interprets audio signals 800a and 800b as coming from the right and is thereby guided toward the virtual butterfly 608 on the right.

Figure 8C:
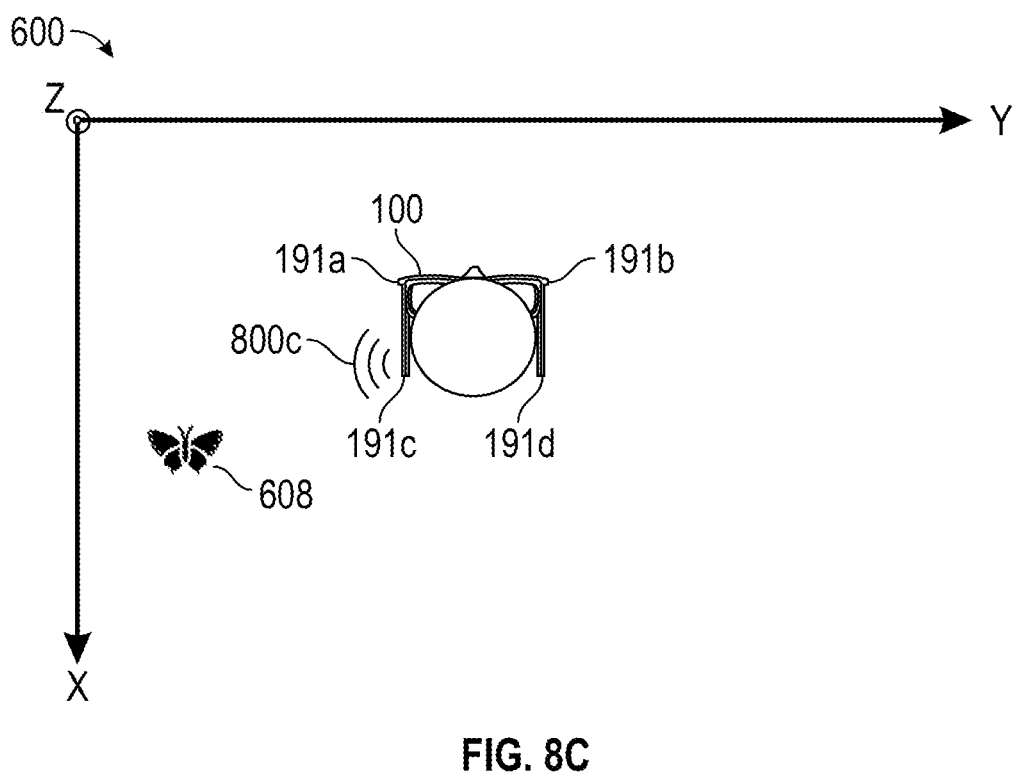

In FIG. 8C, the virtual object location is to the rear and left of the eyewear device 100. The eyewear device 100 determines the angular position of the eyewear device 100 with respect to the virtual object location and selects a directional audio zone associated with speaker 191c causing speakers 191c to emit audio signal 800c. The user interprets audio signal 800c as coming from the rear and left and is thereby guided toward the virtual butterfly 608 to the rear and left. Additionally, because the virtual object location in FIG. 8C is closer to the eyewear device 100 than in FIG. 8B, the volume of audio signal 800c may be louder to indicate that the eyewear device 100 is now closer to the virtual object location. When the eyewear device 100 is within a predefined distance of the virtual butterfly 608 (or a user hand gesture captured by the eyewear device 100 is determined to be on or adjacent the virtual butterfly 608), the eyewear device increases a tally (or decreases the tally if the virtual object is associated with a negative count value).

Figure 9:
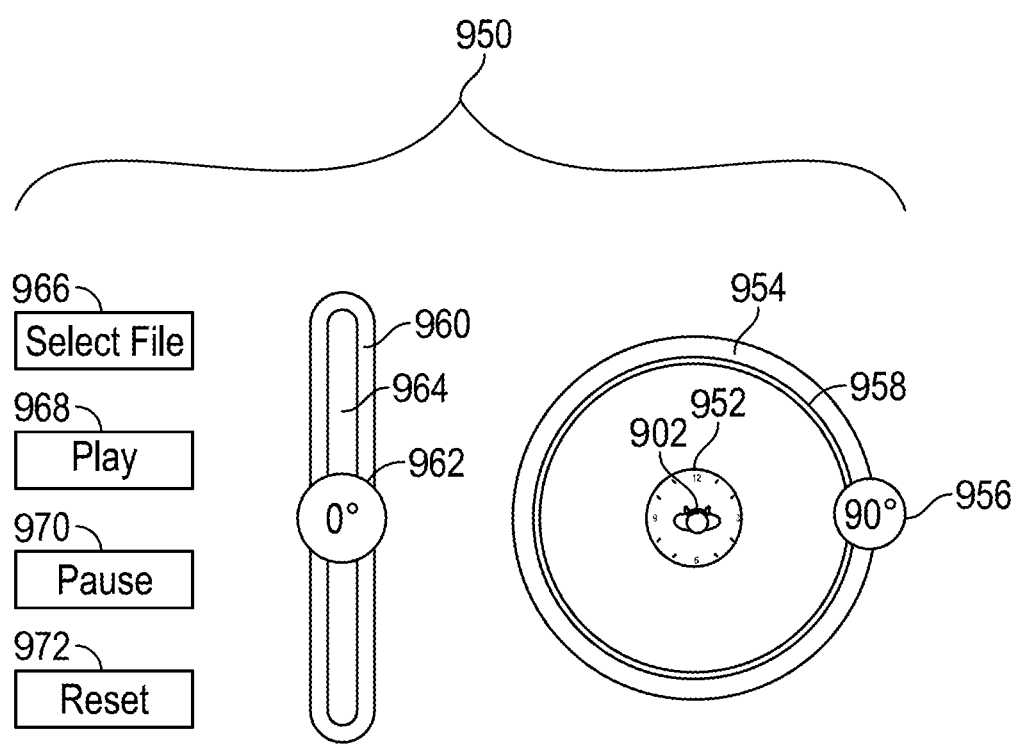
FIG. 9 is an example graphical user interface for use in testing the directional audio associated with virtual objects.
Figure 10:
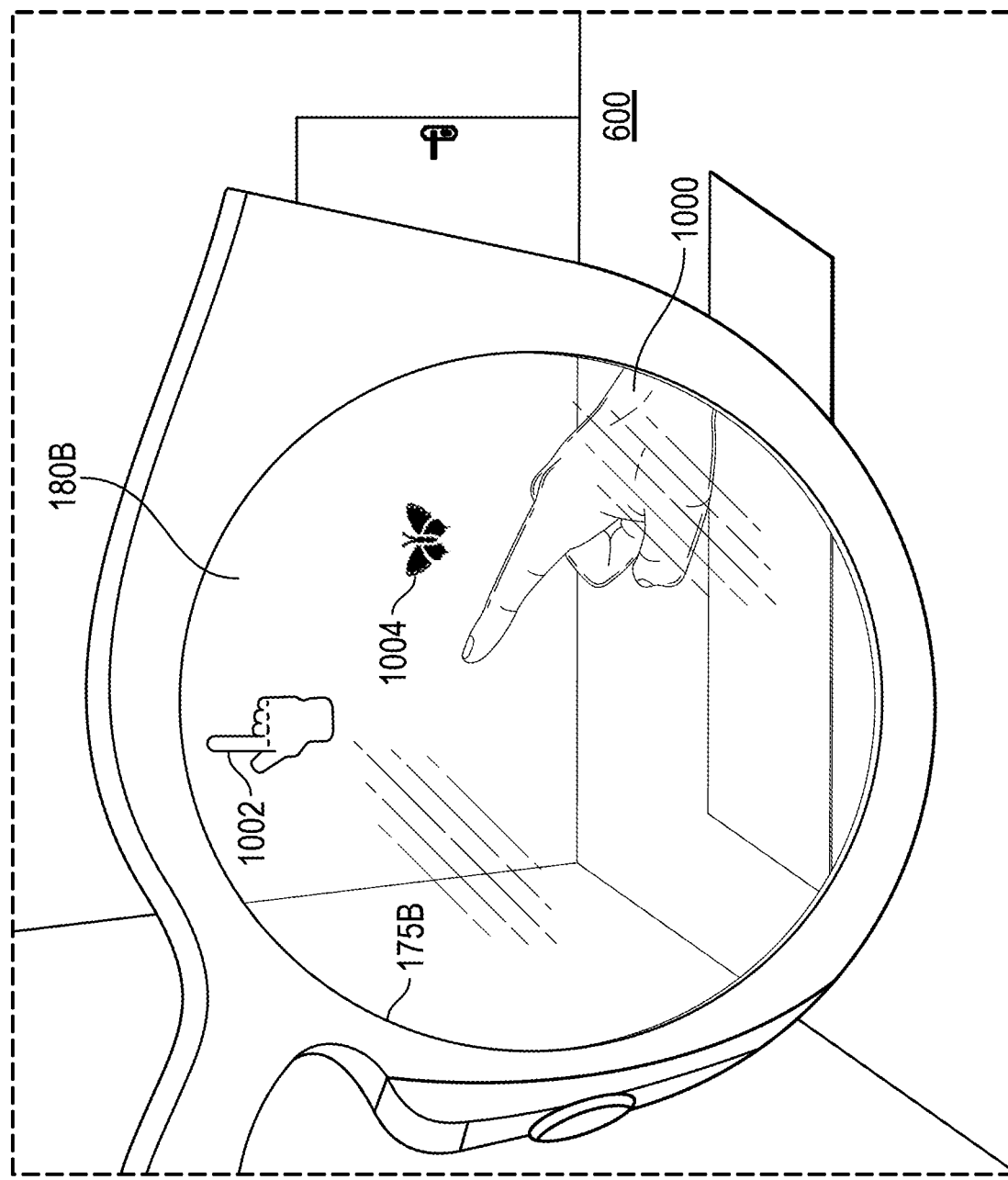
FIG. 10 is a perspective illustration of a virtual object presented on a display of an eyewear device.

FIG. 9 is an example graphical user interface (GUI) 950 for testing audio output settings relating to a selected position of a virtual object with respect to the head 902 of the user. Other GUIs (not shown) may be used to control, in some examples, aspects of the themes, animation states, audio settings, etc. relating to a virtual object.

For the GUI depicted in FIG. 9, a clock 952 is present around the head 902 of the user to represent various sectors/zones surrounding the head 902. A circular control 954 and a linear control 960 are present to select desired audio zones. Similar controls may be used to control other aspects relating to a virtual object.

The circular control 954 is present around the clock 952. The circular control includes a circular track 958 and a selector 956 positioned within the track 958 for selecting a sound and direction of the sound such as desired area for identifying an object that may be used to associate a virtual object. The illustrated selector 956 includes an indicator representing angular information associated with the desired direction from which the sound should be perceived as coming from (90 degrees in the illustrated example representing that the sound should appear as if it is coming from the right side of the user). A user moves the selector 956 around the circular track 958 to change the direction selection.

The linear control 960 includes a linear track 964. A selector 962 is positioned within the track 964 for selecting a height from which a sound should be perceived as coming from (e.g., ear level, below ear level, or above ear level. A user moves the selector 962 along the track 964 to change the perceived level.

The GUI 950 additionally includes an audio selection button 966 for selecting an audio track for a desired theme, a play button 968 for playing the selected audio track, a pause button 970 for pausing the audio track, and a reset button 972 for resetting the indicators 956/962 to their default locations.

GUIs may be presented on the display 180 of the eyewear device 100, the display 580 of the mobile device 401 or the display for a remote computer such as a server system 498. In one example, a user may manipulate the selectors 956/962 and actuate the buttons 966/968/970/972 using a user input device 491 of the eyewear device 100, using user input layer 591 of the mobile device, or a user input of another device.

In another example, a user may manipulate the selectors 956/962 and actuate the buttons 966/968/970/972 through hand gestures captured by the cameras 114 of the eyewear device. In accordance with this example, the processor 432 of an eyewear device 100 is configured to capture frames of video data with a camera 114A, 114B. Objects in the images are compared to the hand gesture library 480 to identify predefined hand gestures (e.g., a pointing index finger) associated with an action. When a hand gesture is identified, its position is determined with respect to the selectors 956/962 and actuate the buttons 966/968/970/972. A modification of the hand gesture (e.g., a tapping motion when the tip of the index finger is near a button or a swiping motion when the tip of the index finger is near a selector) results in an actuation of the buttons/selector.

The process of determining whether a detected hand shape matches a predefined gesture, in some implementations, involves comparing the pixel-level data about the hand shape in one or more captured frames of video data to the collection of hand gestures stored in the hand gesture library 480. The detected hand shape data may include three-dimensional coordinates for the wrist, up to fifteen interphalangeal joints, up five fingertips, and other skeletal or soft-tissue landmarks found in a captured frame. These data are compared to hand gesture data stored in the hand gesture library 480 until the best match is found. In some examples, the process includes calculating the sum of the geodesic distances between the detected hand shape fingertip coordinates and a set of fingertip coordinates for each hand gesture stored in the library 480. A sum that is within a configurable threshold accuracy value represents a match.

In another example implementation, the process of determining whether a detected hand shape matches a predefined gesture, involves using a machine-learning algorithm to compare the pixel-level data about the hand shape in one or more captured frames of video data to a collection of images that include hand gestures.

Machine learning refers to an algorithm that improves incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

In the context of computer vision, mathematical models attempt to emulate the tasks accomplished by the human visual system, with the goal of using computers to extract information from an image and achieve an accurate understanding of the contents of the image. Computer vision algorithms have been developed for a variety of fields, including artificial intelligence and autonomous navigation, to extract and analyze data in digital images and video.

Deep learning refers to a class of machine-learning methods that are based on or modeled after artificial neural networks. An artificial neural network is a computing system made up of a number of simple, highly interconnected processing elements (nodes), which process information by their dynamic state response to external inputs. A large artificial neural network might have hundreds or thousands of nodes.

A convolutional neural network (CNN) is a type of neural network that is frequently applied to analyzing visual images, including digital photographs and video. The connectivity pattern between nodes in a CNN is typically modeled after the organization of the human visual cortex, which includes individual neurons arranged to respond to overlapping regions in a visual field. A neural network that is suitable for use in the determining process described herein is based on one of the following architectures: VGG16, VGG19, ResNet50, Inception V3, Xception, or other CNN-compatible architectures.

In the machine-learning example, the processor 432 determines whether a detected hand shape substantially matches a predefined gesture using a machine-trained algorithm referred to as a hand feature model. The processor 432 is configured to access the hand feature model, trained through machine learning, and applies the hand feature model to identify and locate features of the hand shape in one or more frames of the video data.

In one example implementation, the trained hand feature model receives a frame of video data which contains a detected hand shape and abstracts the image in the frame into layers for analysis. Data in each layer is compared to hand gesture data stored in the hand gesture library 480, layer by layer, based on the trained hand feature model, until a good match is identified.

In one example, the layer-by-layer image analysis is executed using a convolutional neural network. In a first convolution layer, the CNN identifies learned features (e.g., hand landmarks, sets of joint coordinates, and the like). In a second convolution layer, the image is transformed into a plurality of images, in which the learned features are each accentuated in a respective sub-image. In a pooling layer, the sizes and resolution of the images and sub-images are reduced in order isolation portions of each image that include a possible feature of interest (e.g., a possible palm shape, a possible finger joint). The values and comparisons of images from the non-output layers are used to classify the image in the frame. Classification, as used herein, refers to the process of using a trained model to classify an image according to the detected hand shape. For example, an image may be classified as "pointer gesture present" if the detected hand shape matches the pointer gesture from the library 480.

In some example implementations, the processor 432, in response to detecting a pointing gesture, presents on the display 180A-B an indicator 1002 (see FIG. 10). The indicator 1002 informs the wearer that a predefined gesture has been detected. The indicator 1002 in one example is an object, such as the pointing finger shown in FIG. 10. The indicator 1002 may include one or more visible, audible, tactile, and other elements to inform or alert the wearer that a pointer gesture has been detected. A user may move the indicator 1002 by moving the detected hand gesture within the field of view of the eyewear device 100.

The functionality described herein for the eyewear device 100, the mobile device 401, the remote device 402, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to produce one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™ ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. An eyewear device comprising:
a speaker system;
at least one image sensor having a field of view;
a display having a viewing area corresponding to the field of view;
a support structure configured to be head-mounted on a user, the support structure supporting the speaker system and the at least one image sensor; and
a processor, a memory, and programming in said memory, wherein execution of said programming by said processor configures the eyewear device to:
capture, with the at least one image sensor, image information of an environment surrounding the eyewear device;
identify an object location within the environment;
associate a virtual object with the identified object location;
monitor position of the eyewear device with respect to the virtual object responsive to the captured image information;
determine when the object location is within the viewing area of the display;
present, on the display, video signals including the virtual object in the object location responsive to the monitored position when the identified object location is determined to be within the viewing area;
randomly select an object type for the virtual object from at least a first object type and second object type, the first object type associated with a first set of animation states and the second object type associated with a second set of animation states;
wherein to present the virtual object the eyewear device is configured to present the first set of animation states when the first object type is selected and to present the second set of animation states when the second object type is selected;
wherein the first object type is associated with a positive score and the second object type is associated with a negative score and wherein execution of the programming by said processor further configures the eyewear device to:
maintain a tally for the user;
detect when the eyewear device is within a predefined threshold of the object location; and
increase the tally by the positive score when the virtual object has the first object type and decrease the tally by the negative score when the virtual object has the second object type; and
present audio signals, with the speaker system, responsive to the monitored position to alert the user that the identified object is in the environment.

2. The eyewear device of claim 1, wherein the speaker system includes at least two speakers that produce at least three directional audio zones and wherein to present the audio signals the eyewear is configured to:
determine a current orientation of the eyewear device with respect to the object location;
select one of the at least three directional audio zones responsive to the current orientation; and
present a first audio signal with a first of the at least two speakers and a second audio signal with a second of the at least two speakers associated with the virtual object, the first and second audio signals responsive to the selected directional audio zone.

3. The eyewear device of claim 2, wherein the support structure of the eyewear device comprises:

a frame having a first side and a second side;

a first temple extending from a first side of the frame, the first temple having a proximal end adjacent the first side of the frame and a distal end; and a second temple extending from a second side of the frame, the second temple having a proximal end adjacent the second side of the frame and a distal end;

wherein, when the support structure is positioned on the head of the user, the first speaker of the at least two speakers is positioned on the first temple such that it is adjacent a first ear of the user and the second speaker of the at least two speakers is positioned on the second temple such that it is adjacent a second ear of the user.

4. The eyewear device of claim 1, wherein to identify the object location within the environment the eyewear device is configured to:

generate a random location within the environment; and identify the random location as the object location.

5. The eyewear device of claim 1, further comprising:

a display having a viewing area corresponding to the field of view;

wherein the virtual object has a first animation state and a second animation state and wherein execution of said programming by said processor configures the eyewear device to:

display, on the display, the first animation state when the location of the eyewear device with respect to the virtual object is greater than a first predefined distance; and transition from the first animation state to a second animation state when the location of the eyewear device with respect to the virtual object reaches the first predefined distance.

6. The eyewear device of claim 1, wherein execution of said programming by said processor configures the eyewear device to:

increasing a decibel level of the audio signals exponentially as the monitored position of the eyewear device approaches the virtual object.

7. The eyewear device of claim 1, wherein said eyewear device further comprises a wireless communication component, said eyewear device is operatively connected to a server system through a network, and said monitored position is stored in another memory in said server system for retrieval by another user.

8. A method for use with an eyewear device configured to be head mounted on a user, the eyewear device comprising a speaker system, at least one image sensor having a field of view, a support structure configured to be head-mounted on a user, a display having a viewing area corresponding to the field of view, a processor, and a memory, the method comprising:

capturing, with the at least one image sensor, image information of an environment surrounding the eyewear device;

identifying an object location within the environment;

associating a virtual object with the identified object location;

monitoring position of the eyewear device with respect to the virtual object responsive to the captured image information;

randomly selecting an object type for the virtual object from at least a first object type and second object type, wherein the first object type is associated with a positive score and the second object type is associate with a negative score, and wherein the first object type associated with a first set of animation states and the second object type associated with a second set of animation states;

presenting, on the display, the first set of animation states when the first object type is selected and presenting the second set of animation states when the second object type is selected;

maintaining a tally for the user;

detecting when the eyewear device is within a predefined threshold of the object location; and increasing the tally by the positive score when the virtual object has the first object type and decrease the tally by the negative score when the virtual object has the second object type; and presenting audio signals, with the speaker system, responsive to the monitored position to alert the user that the identified object is in the environment.

9. The method of claim 8, wherein the step of providing audio signals further comprises the step of:

increasing a decibel level of the audio signals exponentially as the monitored position of the eyewear device approaches the virtual object.

10. The method of claim 8, wherein said eyewear device further comprises a wireless communication component, said eyewear device is operatively connected to a server system through a network, and said monitored position is stored in another memory in said server system for retrieval by another user.

11. The method of claim 8, wherein the speaker system includes at least two speakers that produce at least three directional audio zones and wherein the presenting the audio signals comprises:

determining a current orientation of the eyewear device with respect to the object location;

selecting one of the at least three directional audio zones responsive to the current orientation; and presenting a first audio signal in the selected directional audio zone.

12. The method of claim 8, wherein the eyewear device further comprises a display having a viewing area corresponding to the field of view and wherein the method further comprises:

determining when the object location is within the field of view; and presenting, on the display, the virtual object in the object location is within the field of view.

13. The method of claim 12, wherein the identifying the object location within the environment comprises:

generating a random location within the environment outside the field of view; and identifying the random location as the object location.

14. The method of claim 8, further comprising:

determining a change in position of the eyewear device in relation to the virtual object, wherein the virtual object has a first animation state; and generating a second animation state for the virtual object responsive to the determined change in position.

15. A non-transitory computer-readable medium storing program code for use with an eyewear device configured to be head mounted on a user, the eyewear device comprising a processor, a memory, at least one image sensor having a field of view, a display having a viewing area corresponding to the field of view, and a speaker system, the program code, when executed, is operative to cause an electronic processor to:

capture, with the at least one image sensor, image information of an environment surrounding the eyewear device;
identify an object location within the environment;
associate a virtual object with the identified object location;
monitor position of the eyewear device with respect to the virtual object responsive to the captured image information;
randomly select an object type for the virtual object from at least a first object type and second object type, wherein the first object type is associated with a positive score and the second object type is associate with a negative score, and wherein the first object type associated with a first set of animation states and the second object type associated with a second set of animation states;
present, on the display, the first set of animation states when the first object type is selected and presenting the second set of animation states when the second object type is selected;
maintain a tally for the user;
detect when the eyewear device is within a predefined threshold of the object location;
increase the tally by the positive score when the virtual object has the first object type and decrease the tally by the negative score when the virtual object has the second object type; and
present audio signals, with the speaker system, responsive to the monitored position to alert the user that the identified object is in the environment.

16. The non-transitory computer-readable medium of claim 15, wherein the speaker system includes at least two speakers configured to produce at least three directional audio zones, wherein the program code to present audio signals includes program code operative to cause the electronic processor to:
determine a current orientation of the eyewear device with respect to the object location;
select one of the at least three directional audio zones responsive to the current orientation; and
present a first audio signal with a first of the at least two speakers and a second audio signal with a second of the at least two speakers associated with the virtual object, the first and second audio signals responsive to the selected directional audio zone.

* * * * *